US012725938B2

(12) United States Patent
Sone et al.

(10) Patent No.: US 12,725,938 B2
(45) Date of Patent: Sep. 1, 2026

(54) ANTENNA DEVICE

(71) Applicant: YOKOWO CO., LTD., Tokyo (JP)

(72) Inventors: Takayuki Sone, Tomioka (JP); Seiya Hiroki, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 157 days.

(21) Appl. No.: 18/562,354

(22) PCT Filed: Jun. 9, 2022

(86) PCT No.: PCT/JP2022/023362

§ 371 (c)(1),
(2) Date: Nov. 20, 2023

(87) PCT Pub. No.: WO2023/276604

PCT Pub. Date: Jan. 5, 2023

(65) Prior Publication Data

US 2024/0243487 A1 Jul. 18, 2024

(30) Foreign Application Priority Data

Jun. 28, 2021 (JP) ................................ 2021-106723

(51) Int. Cl.
*H01Q 21/24* (2006.01)
*H01Q 5/364* (2015.01)
*H01Q 9/28* (2006.01)

(52) U.S. Cl.
CPC ............. *H01Q 21/24* (2013.01); *H01Q 5/364* (2015.01); *H01Q 9/28* (2013.01)

(58) Field of Classification Search
CPC .......... H01Q 21/24; H01Q 5/364; H01Q 9/28; H01Q 9/285; H01Q 21/28
See application file for complete search history.

(56) References Cited

U.S. PATENT DOCUMENTS 5,280,297 A * 1/1994 Profera, Jr. ............. H01Q 3/46 343/754
2014/0232606 A1 8/2014 Niver et al.
(Continued)

FOREIGN PATENT DOCUMENTS

CN 112688057 A * 4/2021
JP 2013-176139 A 9/2013
(Continued)

OTHER PUBLICATIONS

International Search Report and Written Opinion mailed on Sep. 13, 2022, received for PCT Application PCT/JP2022/023362, filed on Jun. 9, 2022, 9 pages including English Translation.
(Continued)

*Primary Examiner* — Dieu Hien T Duong
(74) *Attorney, Agent, or Firm* — XSENSUS LLP

(57) ABSTRACT

An antenna device includes: a first planar antenna for a linearly polarized wave, the first planar antenna including a first feeding portion; and a second planar antenna for a linearly polarized wave, the second planar antenna including a second feeding portion that overlaps the first feeding portion in a plan view when viewed in a direction perpendicular to a predetermined surface of the first planar antenna, wherein the linearly polarized wave of the first planar antenna and the linearly polarized wave of the second planar antenna intersect each other.

15 Claims, 31 Drawing Sheets

(56) References Cited

U.S. PATENT DOCUMENTS

| | | | |
|---|---|---|---|
| 2019/0190136 | A1 | 6/2019 | Sone |
| 2021/0234284 | A1 | 7/2021 | Sampo et al. |

FOREIGN PATENT DOCUMENTS

| | | | |
|---|---|---|---|
| JP | 2014-527360 | A | 10/2014 |
| WO | 2018/055854 | A1 | 3/2018 |
| WO | 2020/027156 | A1 | 2/2020 |
| WO | 2023/276604 | A1 | 1/2023 |

OTHER PUBLICATIONS

Office Action issued on Jun. 18, 2024, in corresponding Japanese patent Application No. 2023-192136, 3 pages.
Office Action issued Sep. 30, 2025 in counterpart Japanese Application No. JP2023-531751. (8 pgs).

* cited by examiner

ANTENNA DEVICE

CROSS-REFERENCE TO RELATED APPLICATIONS

The present application is based on PCT filing PCT/JP2022/023362, filed Jun. 9, 2022, which claims priority from Japanese Patent Application No. 2021-106723, filed Jun. 28, 2021, the entire contents of each are incorporated herein by reference.

TECHNICAL FIELD

The present disclosure relates to an antenna device.

BACKGROUND ART

PTL 1 discloses an antenna device including two dipole antennas arranged in parallel with each other.

CITATION LIST

Patent Literature

[PTL 1] Japanese Unexamined Patenttent Application Publication No. 2013-176139

SUMMARY OF INVENTION

Technical Problem

Meanwhile, in the case of an antenna device including two antennas for linearly polarized waves arranged in parallel with each other, the directions in which gains drop sometimes coincide between the two antennas, which reduces the degree of freedom in installing the antenna device.

The present disclosure is directed, for example, to improvement of a degree of freedom in installing an antenna device including a plurality of antennas. Others that the present disclosure is directed to will become apparent from the description of the present specification.

Solution to Problem

An aspect of the present disclosure is an antenna device comprising: a first planar antenna for a linearly polarized wave, the first planar antenna including a first feeding portion; and a second planar antenna for a linearly polarized wave, the second planar antenna including a second feeding portion that overlaps the first feeding portion in a plan view when viewed in a direction perpendicular to a predetermined surface of the first planar antenna, wherein the linearly polarized wave of the first planar antenna and the linearly polarized wave of the second planar antenna intersect each other.

According to an aspect described above of the present disclosure, it is possible to improve a degree of freedom in installing an antenna device including a plurality of antennas.

DESCRIPTION OF EMBODIMENTS

At least following matters will become apparent from the description of the present specification and drawings.

The following describes preferable embodiments of the present disclosure with reference to drawings. Components, members, and the like that are the same or equivalent in drawings are given the same reference signs, and repetitive description thereof is omitted as appropriate.

==Antenna Device 10==

<<Overview of Antenna Device 10>>

First, the overview of an antenna device 10 including a first antenna 30 and a second antenna 40 will be described with reference to FIG. 1 and FIG. 2.

Figure 1:
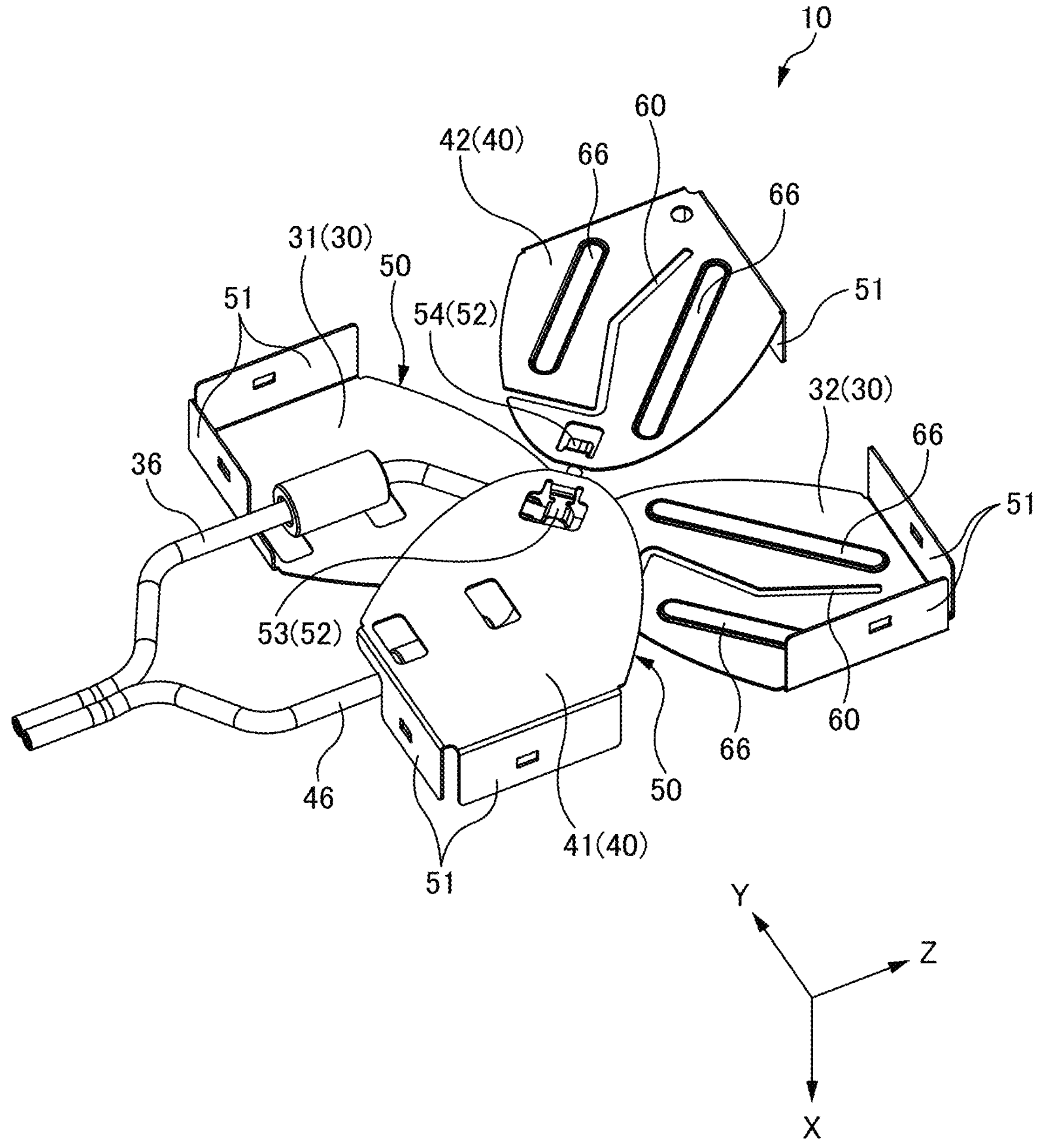
FIG. 1 is a perspective view of an antenna device 10.

FIG. 1 is a perspective view of the antenna device 10. FIG. 2 is a plan view of the antenna device 10.

Figure 2:
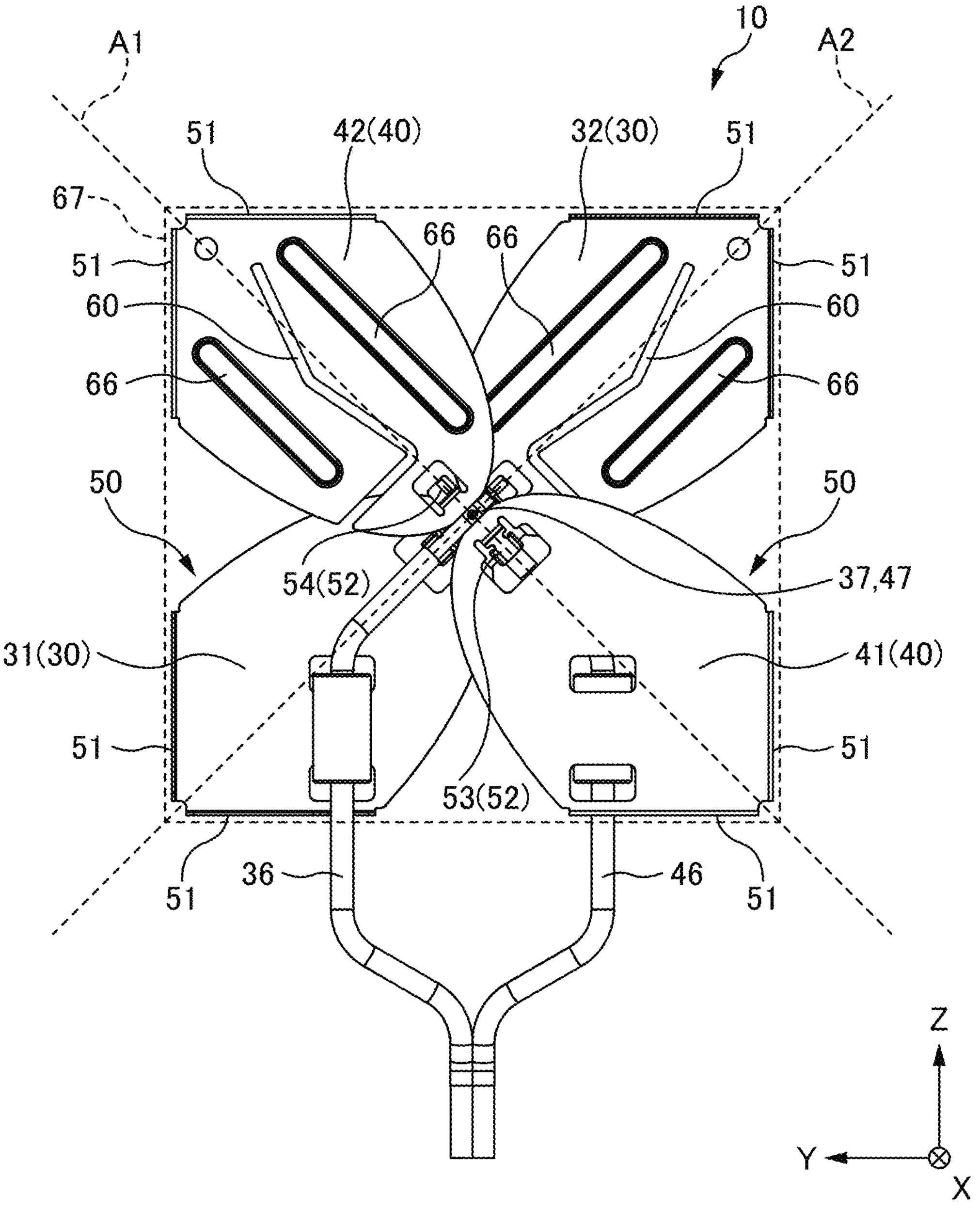
FIG. 2 is a plan view of an antenna device 10.

In FIG. 1 and FIG. 2, a direction perpendicular to a surface of the first antenna 30 at which a coupling portion 52 described later is provided (a surface of a main body portion 50 described later) is referred to as X direction. A direction from the main body portion 50 of the second antenna 40 toward a main body portion 50 of the first antenna 30 is referred to as +X direction, and a direction opposite thereto (a direction from the main body portion 50 of the first antenna 30 toward the main body portion 50 of the second antenna 40) is referred to as −X direction. Note that the X direction is also a direction perpendicular to a surface of the second antenna 40 at which a coupling portion 52 is provided (a surface of the main body portion 50).

In addition, in FIG. 1 and FIG. 2, a direction perpendicular to the X direction is referred to as Y direction. A direction from a second outer conductor-side element 41 described later toward a first outer conductor-side element 31 described later is referred to as +Y direction, and a direction opposite thereto (a direction from the first outer conductor-side element 31 toward the second outer conductor-side element 41) is referred to as −Y direction.

In addition, in FIG. 1 and FIG. 2, a direction perpendicular to the X direction and the Y direction is referred to as Z direction. A direction from the first outer conductor-side element 31 toward a second inner conductor-side element 42 described later is referred to as +Z direction, and a direction opposite thereto (a direction from the second inner conductor-side element 42 toward the first outer conductor-side element 31) is referred to as −Z direction.

The antenna device 10 includes a plurality of antennas. The antenna device 10 of an embodiment of the present disclosure includes two antennas, that is, the first antenna 30 and the second antenna 40. However, the antenna device 10 may include three or more antennas.

In addition, the antenna device 10 performs Multiple-Input Multiple-Output (MIMO) communications, for example. In MIMO communications, data is transmitted from each of a plurality of antennas, and data is received simultaneously by a plurality of antennas. In the antenna device 10 of an embodiment of the present disclosure, data is transmitted from each of the first antenna 30 and the second antenna 40 included in the antenna device 10, and data is received simultaneously by the first antenna 30 and the second antenna 40. However, the antenna device 10 may be used in other than MIMO communications, as long as the antenna device 10 includes a plurality of antennas.

The antenna device 10 of an embodiment of the present disclosure supports a wide frequency band such as 698 MHz to 5 GHz for 4G, 5G, and LTE, for example. However, the antenna device 10 is not limited thereto, and may support a frequency band for part of 4G, 5G, and LTE (for example, only for 5G), or may support a frequency band for Telematics, or may support a frequency band for other than 4G, 5G, and LTE.

The antenna device 10 includes the first antenna 30, the second antenna 40, a first feeding line 36, and a second feeding line 46.

Each of the first antenna 30 and the second antenna 40 is an antenna for a linearly polarized wave. In an embodiment of the present disclosure, each of the first antenna 30 and the second antenna 40 is an antenna for a linearly polarized wave. The linearly polarized wave is also referred to as, for example, a vertically polarized wave when the polarization plane is perpendicular to the ground, or is also referred to as a horizontally polarized wave when the polarization plane is a plane horizontal to the ground. Note that, more specifically, the first antenna 30 and the second antenna 40 are wideband antennas based on a bowtie antenna or a dipole antenna. However, the first antenna 30 and the second antenna 40 may be bowtie antennas, dipole antennas, or antennas for linearly polarized waves other than bowtie antennas and dipole antennas.

In the antenna device 10 of an embodiment of the present disclosure, the first antenna 30 and the second antenna 40 have similar shapes (outer shape) and configurations. Here, "similar shapes and configurations" do not mean such an extent that the shape and configuration of the first antenna 30 and the shape and configuration of the second antenna 40 are exactly identical to each other. For example, the shape of the first antenna 30 may be partially different from the shape of the second antenna 40. In addition, the first antenna 30 may have a configuration different from that of the second antenna 40, or reversely the second antenna 40 may have a configuration different from that of the first antenna 30.

The details of the first antenna 30 and the second antenna 40 will be described later.

The first feeding line 36 is feeding line coupled to the first antenna 30. The second feeding line 46 is feeding line coupled to the second antenna 40. Since each of the first antenna 30 and the second antenna 40 is supplied with power, each of the first antenna 30 and the second antenna 40 includes a feeding portion (a first feeding portion 37 and a second feeding portion 47 described later). Note that the first feeding line 36 and the second feeding line 46 are coaxial cables, for example. In addition, the first feeding line 36 and the second feeding line 46 includes magnetic cores (for example, ferrite cores). Including magnetic cores can reduce leak current. Note that magnetic cores do not have to be included.

<<Overview of First Antenna 30>>

Figure 3:
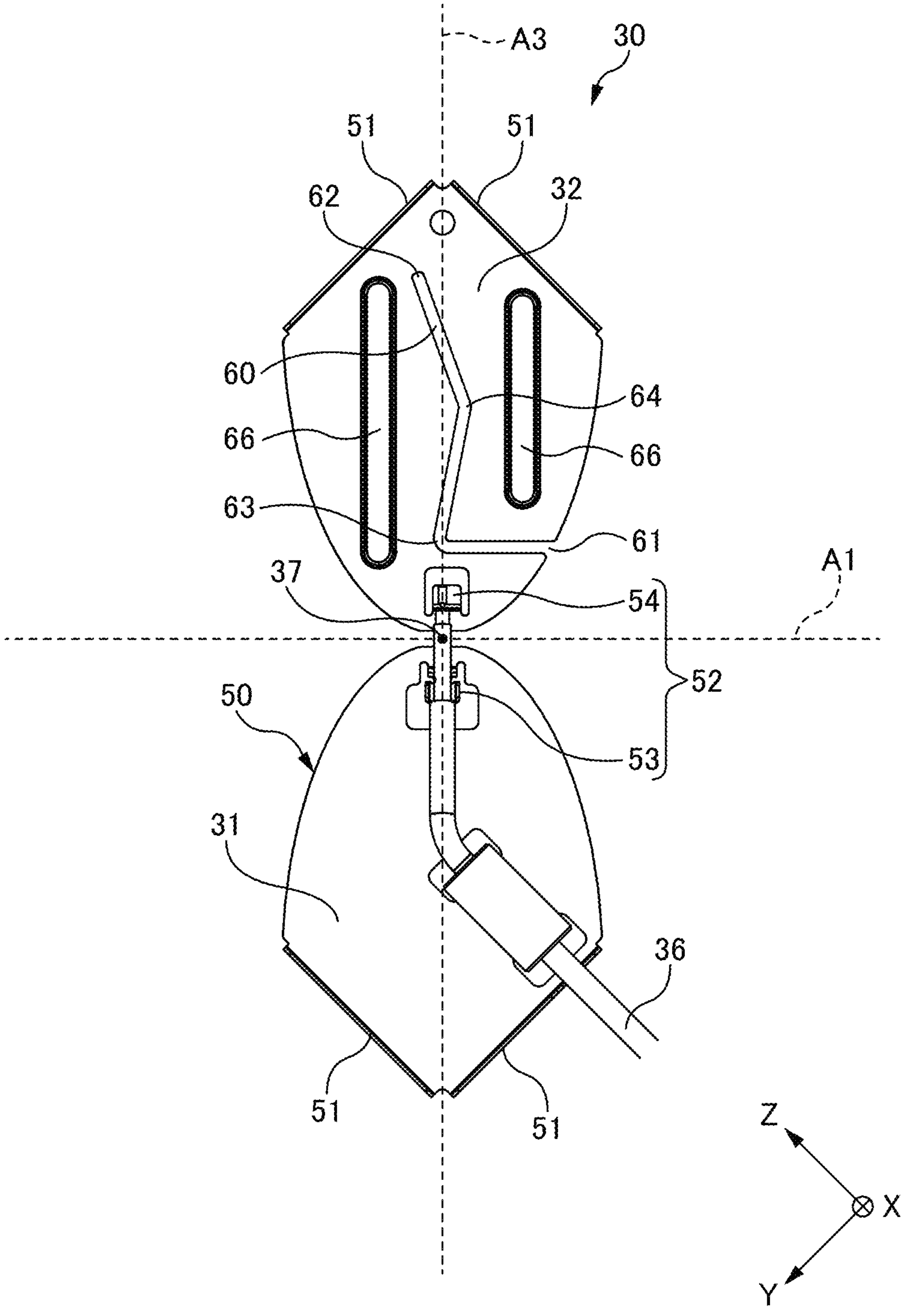
FIG. 3 is a plan view of a first antenna 30.
Figure 4:
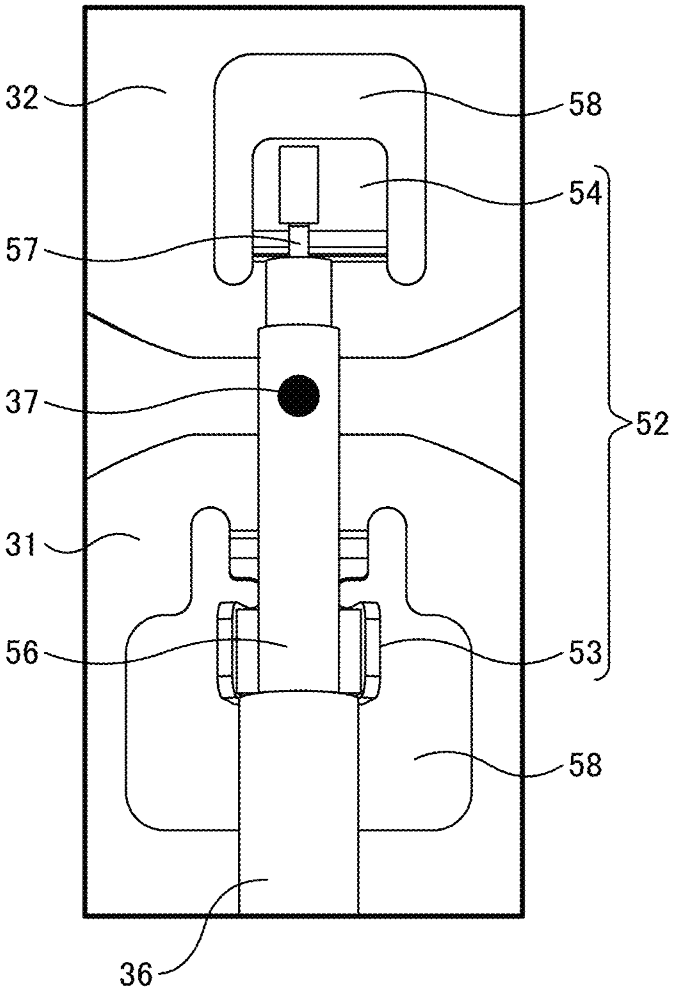
FIG. 4 is an enlarged view of a coupling portion 52 of a first antenna 30 and the surroundings thereof.

FIG. 3 is a plan view of the first antenna 30. FIG. 4 is an enlarged view of the coupling portion 52 of the first antenna 30 and the surroundings thereof.

Hereinafter, the details of the first antenna 30 will be described with reference to FIG. 3 and FIG. 4 together with the above-mentioned FIG. 1 and FIG. 2. Note that as mentioned above, since the first antenna 30 and the second antenna 40 have similar shapes and configurations, the description on the first antenna 30 also applies to the second antenna 40, unless otherwise noted.

In addition, in the following description, the term "first" is sometimes given, to thereby indicate the first antenna 30, and the term "second" is sometimes given, to thereby indicate the second antenna 40. For example, an element configured to be electrically coupled with the outer conductor of the first feeding line 36 of the first antenna 30 is sometimes referred to as "first outer conductor-side element 31". In addition, when a description common to the first antenna 30 and the second antenna 40 is given or when a description for one of the first antenna 30 or the second antenna 40 is given as a representative, the term "first" or "second" is sometimes not given. For example, one of the first inner conductor-side element 32, which is included in the first antenna 30 and electrically coupled with an inner conductor of the first feeding line 36, or the second inner conductor-side element 42, which is included in the second antenna 40 and electrically coupled with an inner conductor of the second feeding line 46, is sometimes referred to simply as “inner conductor-side element”. In addition, both of the first inner conductor-side element 32 of the first antenna 30 and the second inner conductor-side element 42 of the second antenna 40 are sometimes referred to simply as “inner conductor-side element”. Similarly, one of the first outer conductor-side element 31, which is included in the first antenna 30 and electrically coupled with the outer conductor of the first feeding line 36, or the second outer conductor-side element 41, which is included in the second antenna 40 and electrically coupled with the outer conductor of the second feeding line 46, is sometimes referred to simply as “outer conductor-side element”, or both of these are sometimes referred to simply as “outer conductor-side elements”.

<<Overall Shape of First Antenna 30>>

In an embodiment of the present disclosure, the first antenna 30 is a planar antenna. Note that a “planar antenna” is an antenna in which elements of the antenna are mainly formed of plate-shaped members. However, all the elements of the antenna do not have to be formed of plate-shaped members, and the antenna may include a portion in which an element of the antenna is formed of a member other than a plate-shaped member. In addition, a “planar antenna” has a shape with a predetermined width. In the following description, the first antenna is sometimes referred to as “first planar antenna”.

As illustrated in FIG. 1 to FIG. 3, the first antenna 30 includes the main body portion 50 and bent portions 51.

The main body portion 50 is provided with the coupling portion 52 configured to be coupled with the first feeding line 36. The main body portion 50 is formed as a plate-shaped member having a predetermined width. The first antenna 30 includes the main body portion 50 formed as a plate-shaped member, to thereby increase the area (width) for the elements. This enables the first antenna 30 to support a wide frequency band.

In an embodiment of the present disclosure, the bent portions 51 are formed by bending the main body portion 50 formed of a metal plate at end portions thereof. However, the bent portions 51 may be metal plates that are separate from the main body portion 50 and coupled (joined) so as to extend from the end portions of the main body portion 50. Alternatively, a configuration may be such that the main body portion 50 is formed of a conductive pattern provided at a substrate, the bent portions 51 are formed of metal plates, and the main body portion 50 and the bent portions 51 are electrically coupled. Alternatively, a configuration may also be such that the main body portion 50 is formed of a metal plate, the bent portions 51 are formed of conductive patterns provided at substrate (s), and the main body portion 50 and the bent portions 51 are electrically coupled. Alternatively, a configuration may also be such that the main body portion 50 and the bent portions 51 are formed of conductive patterns provided at substrate (s), and the main body portion 50 and the bent portions 51 are electrically coupled. Moreover, in the case where the bent portions 51 and the main body portion 50 are separate from each other, the bent portions 51 may be coupled (joined) so as to extend from portions other than the end portions of the main body portion 50. Note that the bent portions 51 may each have a shape obtained by being bent at an obtuse angle, a right angle, or an acute angle relative to the main body portion 50, or may have a curved shape. In addition, the first antenna 30 does not have to include the bent portions 51 and may be configured with only the main body portion 50. That is, the first antenna 30 may be formed of only a plate-shaped member.

Note that the first antenna 30 and the second antenna 40 may be configured with conductive patterns provided at a single substrate. Specifically, a configuration may be such that the first antenna 30 is formed of a conductive pattern provided at one surface of a single substrate, and the second antenna 40 is formed of another conductive pattern provided at the other surface of the single substrate. In this case, the first antenna 30 and the second antenna 40 results in being configured with only the main body portions 50 without including the bent portions 51.

As illustrated in FIG. 1 and FIG. 2, the first antenna 30 and the second antenna 40 are arranged such that the main body portion 50 of the first antenna 30 and the main body portion 50 of the second antenna 40 are separated by a predetermined distance from each other. Preferably, the first antenna 30 and the second antenna 40 are arranged such that the main body portion 50 of the first antenna 30 and the main body portion 50 of the second antenna 40 are in parallel. Here, the term “parallel” is not limited to exactly parallel, but encompasses a case where the first antenna 30 and the second antenna 40 are displaced by a predetermined angle or less.

In addition, as illustrated in FIG. 1 and FIG. 2, the bent portions 51 of the first antenna 30 and the bent portions 51 of the second antenna 40 are formed so as to extend in directions facing each other. Specifically, the bent portions 51 of the first antenna 30 are formed to extend toward the second antenna 40 (in the +X direction), and the bent portions 51 of the second antenna 40 are formed to extend toward the first antenna 30 (in the −X direction). This makes it possible to reduce the size of the antenna device 10 as compared with the case where the bent portions 51 of the first antenna 30 and the bent portions 51 of the second antenna 40 are formed to extend in directions away from each other.

<<Configuration of First Antenna 30>>

As illustrated in FIG. 3, the first antenna 30 includes the first outer conductor-side element 31, the first inner conductor-side element 32, and the first feeding portion 37.

As illustrated in FIG. 3 and FIG. 4, the first outer conductor-side element 31 is an element configured to be coupled with the outer conductor 56 of the first feeding line 36, in the elements of the first antenna 30. In addition, as illustrated in FIG. 3 and FIG. 4, the first inner conductor-side element 32 is an element configured to be coupled with the core 57 (inner conductor) of the first feeding line 36. In addition, the first feeding portion 37 is a region including a feeding point in the first antenna 30.

In an embodiment of the present disclosure, as illustrated in FIG. 3, the first feeding portion 37 is located between the first outer conductor-side element 31 and the first inner conductor-side element 32. Specifically, as illustrated in FIG. 4, the first feeding portion 37 is located at the center of the line segment connecting an end portion of the first outer conductor-side element 31 on the side closest to the first inner conductor-side element 32 and an end portion of the first inner conductor-side element 32 on the side closest to the first outer conductor-side element 31. Note that the term “center” is not limited to the exact center but encompasses a position displaced from the center by a predetermined distance.

In addition, in an embodiment of the present disclosure, as illustrated in FIG. 2, the outer shape of the first outer conductor-side element 31 and the outer shape of the first inner conductor-side element 32 are symmetrical with each other with respect to an axis A1 (hereinafter may be referred to as "first axis") passing through the first feeding portion 37. Here, the expression that the outer shape of one element and the outer shape of the other element are "symmetrical" with respect to the axis A1 means that when the one element is flipped relative to the axis A1, the flipped one element coincides with the other element in outer shape. However, the outer shape of the first outer conductor-side element 31 and the outer shape of the first inner conductor-side element 32 do not have to be completely symmetrical with each other with respect to the axis A1. For example, the outer shape of the first outer conductor-side element 31 may be partially different from the outer shape of the first inner conductor-side element 32.

With the first outer conductor-side element 31, the first inner conductor-side element 32, and the first feeding portion 37 being provided as mentioned above, the first antenna 30 is provided to include a pair of elements (the first outer conductor-side element 31 and the first inner conductor-side element 32) which extend from the first feeding portion 37 in directions away from each other.

In addition, in an embodiment of the present disclosure, the first outer conductor-side element 31 and the first inner conductor-side element 32 have curved contours (outer edges) convex toward the first feeding portion 37 so as to reduce the area of a gap between the first outer conductor-side element 31 and the first inner conductor-side element 32. Specifically, at least part of the shape of each of the first outer conductor-side element 31 and the first inner conductor-side element 32 has an arc shape. That is, this makes the area of the gap between the first outer conductor-side element 31 and the first inner conductor-side element 32 of an embodiment of the present disclosure smaller than the area thereof when each of an outer conductor-side element and an inner conductor-side element is formed in a triangular shape having an apex at a feeding point or has a contour (outer edge) in which two sides sandwiching an apex of a triangle are linearly deformed to protrude outward. An antenna having such a shape is referred to as a wideband antenna based on a bowtie antenna. In this way, such a shape having a small area of the gap and a large capacitance between the first outer conductor-side element 31 and the first inner conductor-side element 32 makes it possible to obtain a favorable band characteristics across a wide band.

<<Relationship Between First Antenna 30 and Second Antenna 40>>

As mentioned above, the second antenna 40 has a shape (outer shape) and configuration similar to those of the first antenna. For example, in the second antenna 40, as illustrated in FIG. 2, the outer shape of the second outer conductor-side element 41 and the outer shape of the second inner conductor-side element 42 are symmetrical with each other with respect to an axis A2 (hereinafter may be referred to as "second axis") passing through the second feeding portion 47. Hence, the second antenna 40 is provided to include a pair of elements (the second outer conductor-side element 41 and the second inner conductor-side element 42) which extend from the second feeding portion 47 in directions away from each other.

In addition, in an embodiment of the present disclosure, the first antenna 30 and the second antenna 40 are arranged such that the first feeding portion 37 and the second feeding portion 47 overlap in the plan view illustrated in FIG. 2. Moreover, in an embodiment of the present disclosure, the direction in which the pair of elements of the first antenna 30 extends intersects the direction in which the pair of elements of the second antenna 40 extends.

Here, the expression that the first feeding portion 37 and the second feeding portion 47 "overlap" encompasses both a case where the range of the first feeding portion 37 and the range of the second feeding portion 47 coincide with each other in the plan view and a case where part of the range of the first feeding portion 37 and part of the range of the second feeding portion 47 coincide with each other in the plan view. Moreover, in the plan view, the range of the second feeding portion 47 may be included in the range of the first feeding portion 37, or reversely in the plan view, the range of the first feeding portion 37 may be included in the range of the second feeding portion 47.

In addition, in this way, in the plan view, part of the first outer conductor-side element 31 of the first antenna 30 overlaps at least part of the second outer conductor-side element 41 and second inner conductor-side element 42 of the second antenna 40, and part of the first inner conductor-side element 32 of the first antenna 30 overlaps at least part of the second outer conductor-side element 41 and second inner conductor-side element 42 of the second antenna 40.

In addition, the expression that the direction in which the pair of elements of the first antenna 30 extend and the direction in which the pair of elements of the second antenna 40 extend "intersect" means that a straight line along the direction in which the pair of elements of the first antenna 30 extend and a straight line along the direction in which the pair of elements of the second antenna 40 extend intersect at a certain point. That is, this means that in the plan view, the straight line along the direction in which the pair of elements of the first antenna 30 extend and the straight line along the direction in which the pair of elements of the second antenna 40 extend are not parallel.

As described above, the first antenna 30 and the second antenna 40 are arranged to intersect each other about the first feeding portion 37 (or the second feeding portion 47) in the plan view. In this event, the first antenna 30 and the second antenna 40 are arranged to have an angle larger than 0° and smaller than 180° about the first feeding portion 37 (or the second feeding portion 47). In other words, the first antenna 30 and the second antenna 40 are arranged such that the linearly polarized wave of the first antenna 30 and the linearly polarized wave of the second antenna 40 intersect.

Moreover, in an embodiment of the present disclosure, the first antenna 30 and the second antenna 40 are arranged to be orthogonal to each other, in the plan view. Here, the term "orthogonal" means that these antennas intersect each other at an angle of 90°. That is, the first antenna 30 and the second antenna 40 are arranged to have an angle of 90° about the first feeding portion 37 (or the second feeding portion 47). In this event, the axis A1 passing through the first feeding portion 37 and the axis A2 passing through the second feeding portion 47 are orthogonal to each other as illustrated in FIG. 2. That is, in an embodiment of the present disclosure, the angle formed by the axis A1 and the axis A2 is 90°. However, the first antenna 30 and the second antenna 40 may intersect at an angle other than 90°, and the angle formed by the axis A1 and the axis A2 may be an angle larger than 0° and smaller than 180°.

In addition, in an embodiment of the present disclosure, the first antenna 30 and the second antenna 40 are housed in a quadrate housing portion 67, for example, as illustrated in FIG. 2. In this event, the first antenna 30 and the second antenna 40 are housed in the housing portion 67 such that the first axis A1 and the second axis A2 are located along diagonal lines of the housing portion 67. This makes it possible to suppress an increase in size of the housing portion 67 while ensuring the lengths of the first antenna 30 and the second antenna 40.

Meanwhile, if the first antenna 30 and the second antenna 40 are arranged in parallel with each other (that is, arranged at an angle of 0°) in the plan view, the radiation pattern of the first antenna 30 and the radiation pattern of the second antenna 40 coincide with each other, which may cause the directions in which gains drop to coincide between the first antenna 30 and the second antenna 40. Accordingly, the antenna device 10 should be installed considering the directivities of the first antenna 30 and the second antenna 40, which may reduce the degree of freedom in installing the antenna device 10. In addition, if the first antenna 30 and the second antenna 40 are arranged in parallel with each other in the plan view, the isolation between the first antenna 30 and the second antenna 40 may be degraded, which may degrade the communication performances such as throughput, coverage, and the like.

Thus, in the antenna device 10 of an embodiment of the present disclosure, by arranging the first antenna 30 and the second antenna 40 such that the linearly polarized wave of the first antenna 30 and the linearly polarized wave of the second antenna 40 intersect, as described above, it is possible to prevent the directions in which gains drop from coinciding between the first antenna 30 and the second antenna 40. That is, in the antenna device 10 of an embodiment of the present disclosure, in the case of using the first antenna 30 and the second antenna 40, the respective radiation patterns thereof obtaining the maximum value of the gain in each azimuth achieve a so-called non-directional pattern. Hence, it is possible to improve the degree of freedom in installing the antenna device 10 without being restricted by the directivity of each of the first antenna 30 and the second antenna 40 configuring the antenna device 10. In an embodiment of the present disclosure, the first antenna 30 and the second antenna 40 are arranged to have an angle of 90° about the first feeding portion 37 (or the second feeding portion 47). However, the direction in which the gain of the first antenna 30 drops and the direction in which the gain of the second antenna 40 drops do not coincide, as long as the angle is larger than 0° and smaller than 180° about the first feeding portion 37 (or the second feeding portion 47), thereby being able to improve the degree of freedom in installing the antenna device 10.

<<Directivities of First Antenna 30 and Second Antenna 40>>

Figure 5:
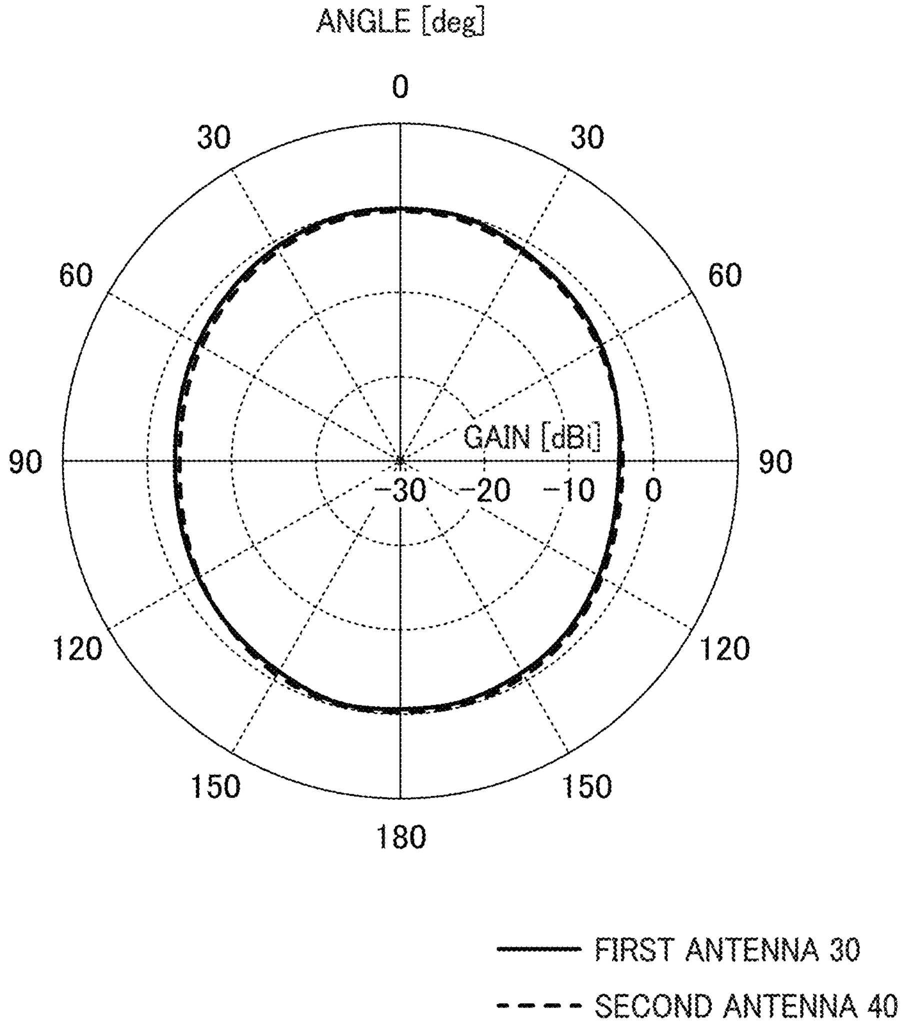
FIG. 5 is a diagram illustrating radiation patterns of a first antenna 30 and a second antenna 40 in an XY plane.
Figure 6:
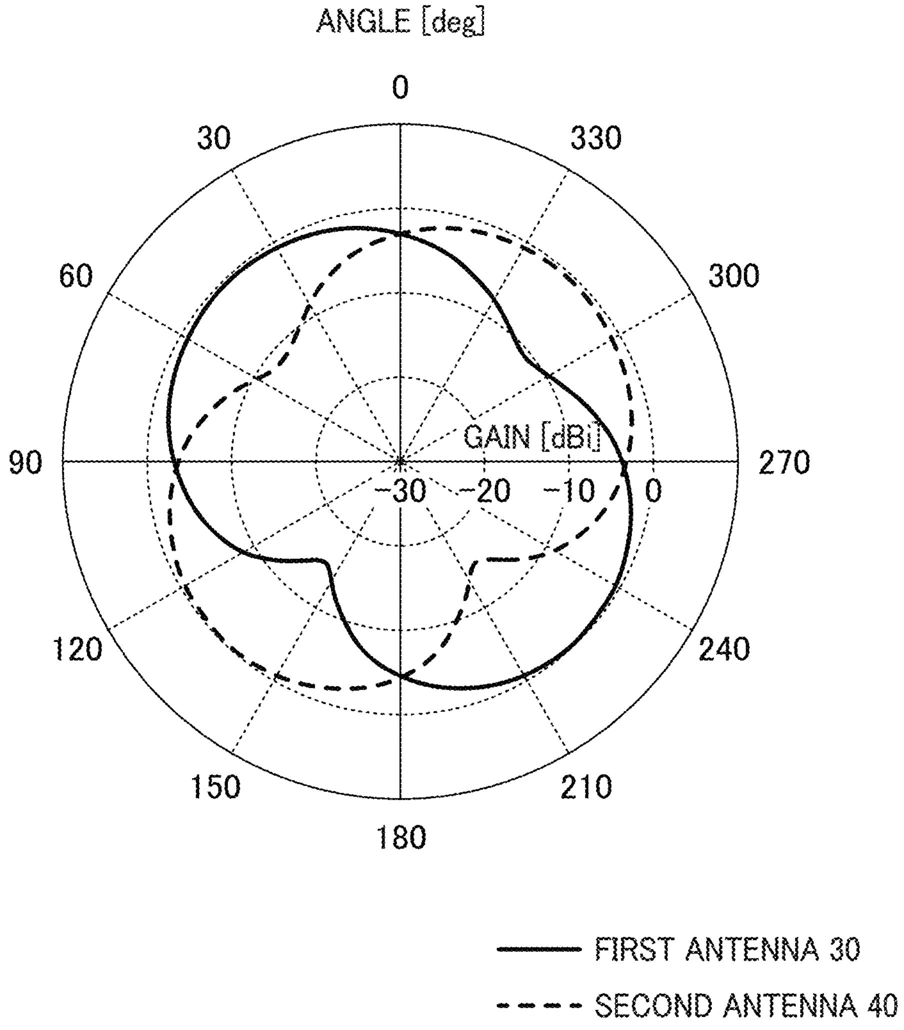
FIG. 6 is a diagram illustrating radiation patterns of a first antenna 30 and a second antenna 40 in a YZ plane.
Figure 7:
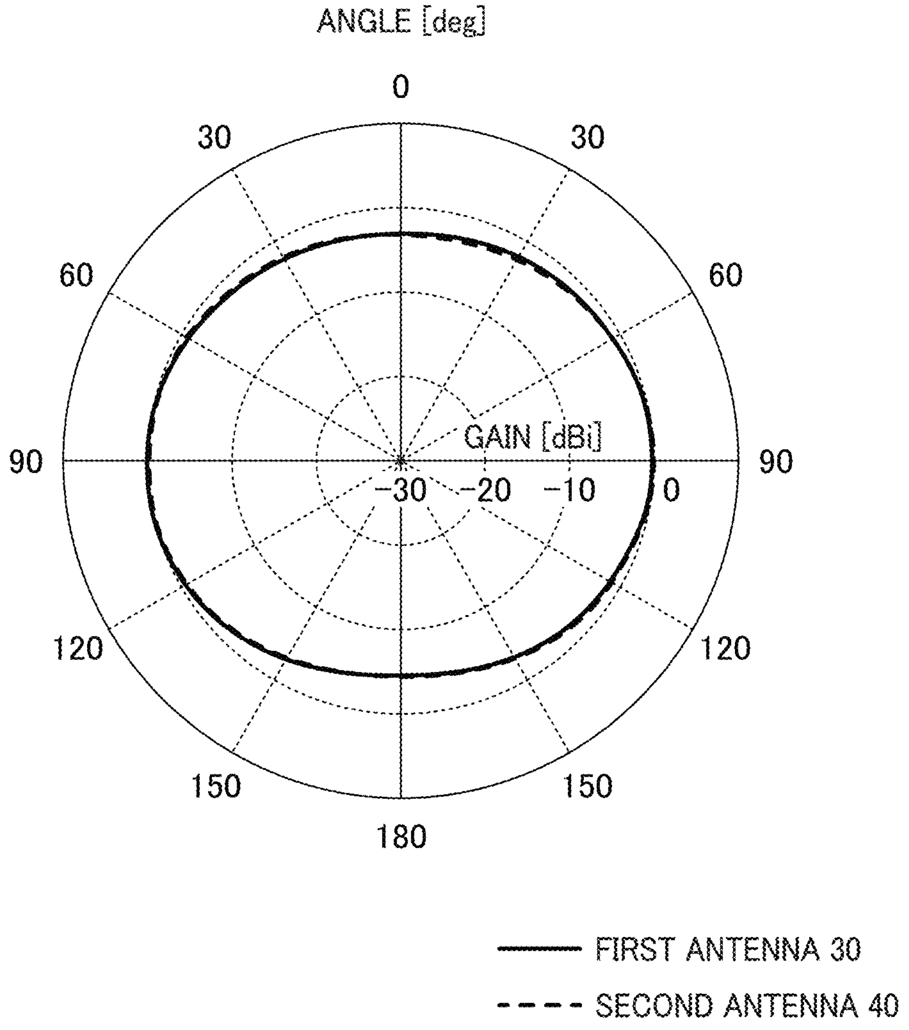
FIG. 7 is a diagram illustrating radiation patterns of a first antenna 30 and a second antenna 40 in a ZX plane.

FIG. 5 is a diagram illustrating radiation patterns of the first antenna 30 and the second antenna 40 in an XY plane. FIG. 6 is a diagram illustrating radiation patterns of the first antenna 30 and the second antenna 40 in a YZ plane. FIG. 7 is a diagram illustrating radiation patterns of the first antenna 30 and the second antenna 40 in a ZX plane.

As illustrated in FIG. 5 and FIG. 7, in the XY plane and the ZX plane, there is no angle, at which the gains of the first antenna 30 and the second antenna 40 outstandingly drop, being observed. On the other hand, as illustrated in FIG. 6, in the YZ plane, the gain of the first antenna 30 has dropped, for example, at around 315° and around 135°. Further, the angles at which the gain of the second antenna 40 is largest are located near these angles. In addition, the gain of the second antenna 40 has dropped, for example, at around 45° and around 225°. Further, the angles at which the gain of the first antenna 30 is largest are located near these angles.

Accordingly, in the antenna device 10 of an embodiment of the present disclosure, the angles at which the gains of the first antenna 30 and the second antenna 40 drop do not coincide. With the first antenna 30 and the second antenna 40 being arranged such that the linearly polarized wave of the first antenna 30 and the linearly polarized wave of the second antenna 40 intersect, such a relationship is achieved in which the gain of one antenna compensates for the drop at the angle at which the gain of the other antenna drops. Accordingly, the antenna device 10 of an embodiment of the present disclosure achieves a so-called non-directional radiation pattern when the first antenna 30 and the second antenna 40 are used. Thus, it is possible to improve the degree of freedom in installing the antenna device 10 without being restricted by the respective directivities of the first antenna 30 and the second antenna 40 included in the antenna device 10.

Comparative Example

Hereinafter, an effect of arranging the first antenna 30 and the second antenna 40 such that the first antenna 30 and the second antenna 40 intersect each other in an embodiment of the present disclosure will be examined by using Comparative Example.

Figure 8A:
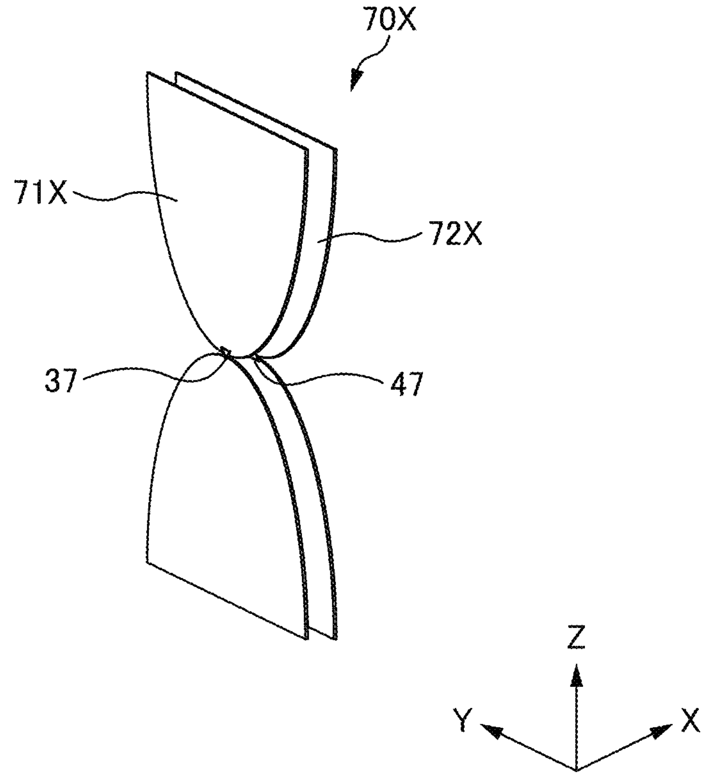
FIG. 8A is a perspective view of an antenna device 70X.
Figure 8B:
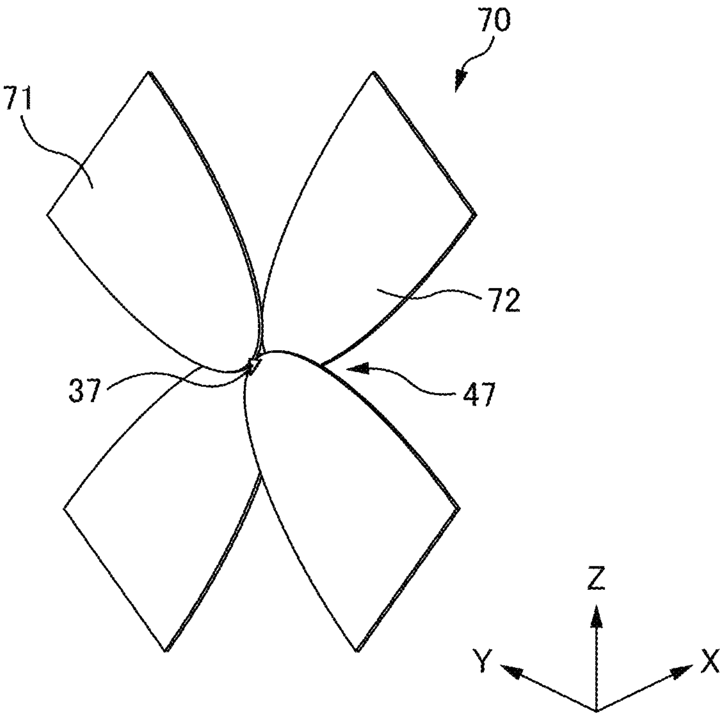
FIG. 8B is a perspective view of an antenna device 70.

FIG. 8A is a perspective view of an antenna device 70X of Comparative Example, and FIG. 8B is a perspective view of an antenna device 70 of an embodiment of the present disclosure.

Here, for the sake of simplification, the radiation pattern of the antenna device 70X of Comparative Example and the radiation pattern of the antenna device 70 of an embodiment of the present disclosure will be examined by using models of bowtie antennas. As illustrated in FIG. 8A and FIG. 8B, the antenna device 70X illustrated in FIG. 8A includes a first antenna 71X and a second antenna 72X. In addition, the antenna device 70 illustrated in FIG. 8B includes a first antenna 71 and a second antenna 72. The first antenna 71X and the first antenna 71 are models obtained by simplifying the first antenna 30 illustrated in the above-mentioned FIG. 1 and FIG. 2, and the second antenna 72X and the second antenna 72 are models obtained by simplifying the second antenna 40 illustrated in the above-mentioned FIG. 1 and FIG. 2.

In the antenna device 70X of Comparative Example, the first antenna 71X and the second antenna 72X are arranged such that the first feeding portion 37 and the second feeding portion 47 overlap in the plan view when viewed in the X direction. In addition, in the antenna device 70 of an embodiment of the present disclosure as well, the first antenna 71 and the second antenna 72 are arranged such that the first feeding portion 37 and the second feeding portion 47 overlap in the plan view when viewed in the X direction.

In this examination, the antenna device 70X of Comparative Example and the antenna device 70 of an embodiment of the present disclosure are different in the angle at which the first antenna and the second antenna are arranged. That is, in the antenna device 70X of Comparative Example, as illustrated in FIG. 8A, the first antenna 71X and the second antenna 72X are arranged in parallel with each other. That is, the first antenna 71X and the second antenna 72X are arranged such that the first axis A1, which is a direction in which the first antenna 71X extends passing through the first feeding portion 37, and the second axis A2, which is a direction in which the second antenna 72X extends passing through the second feeding portion 47, overlap in the plan view when viewed in the X direction. On the other hand, in the antenna device 70 of an embodiment of the present disclosure, as illustrated in FIG. 8B, the first antenna 71 and the second antenna 72 are arranged to intersect at an angle of 90° about the first feeding portion 37 (or the second feeding portion 47) in the plan view when viewed in the X direction. That is, the first antenna 71 and the second antenna 72 are arranged such that the first axis A1, which is a direction in which the first antenna 71 extends passing through the first feeding portion 37, and the second axis A2, which is a direction in which the second antenna 72 extends passing through the second feeding portion 47, intersect at an angle of 90° about the first feeding portion 37 (or the second feeding portion 47) in the plan view when viewed in the X direction.

Figure 9A:
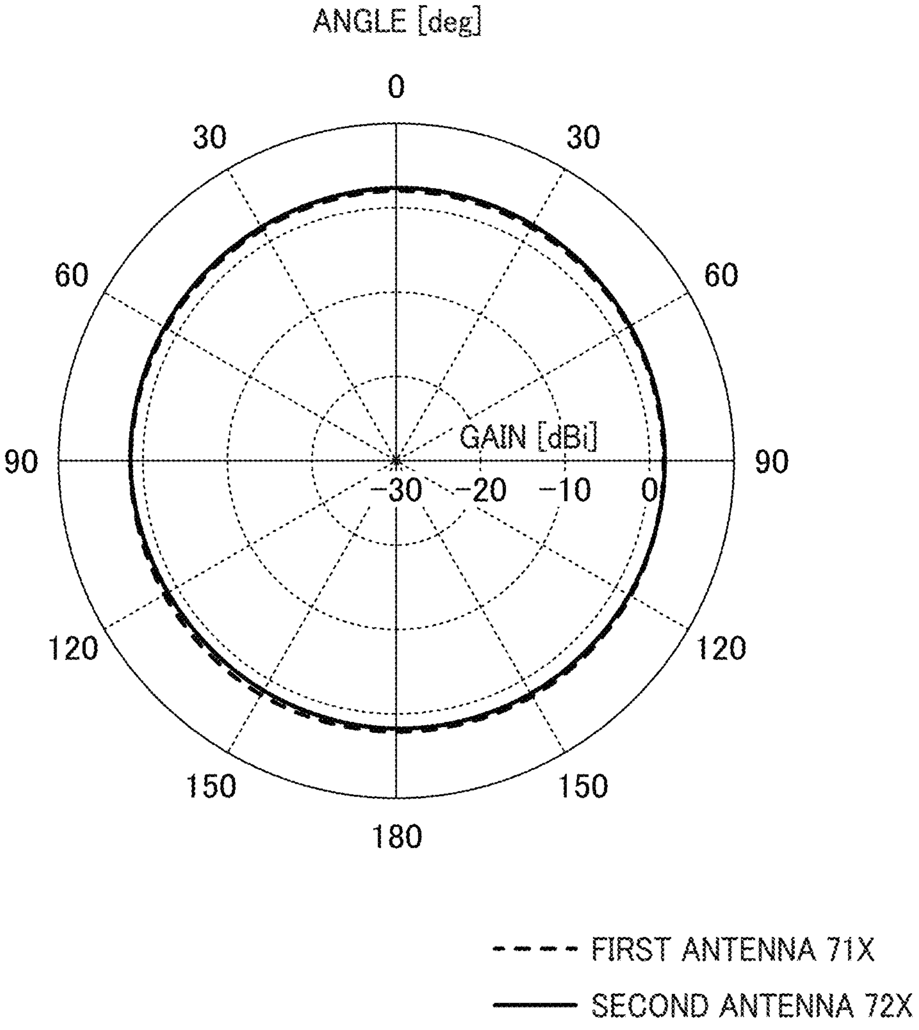
FIG. 9A is a diagram illustrating radiation patterns of a first antenna 71X and a second antenna 72X in an XY plane.
Figure 9B:
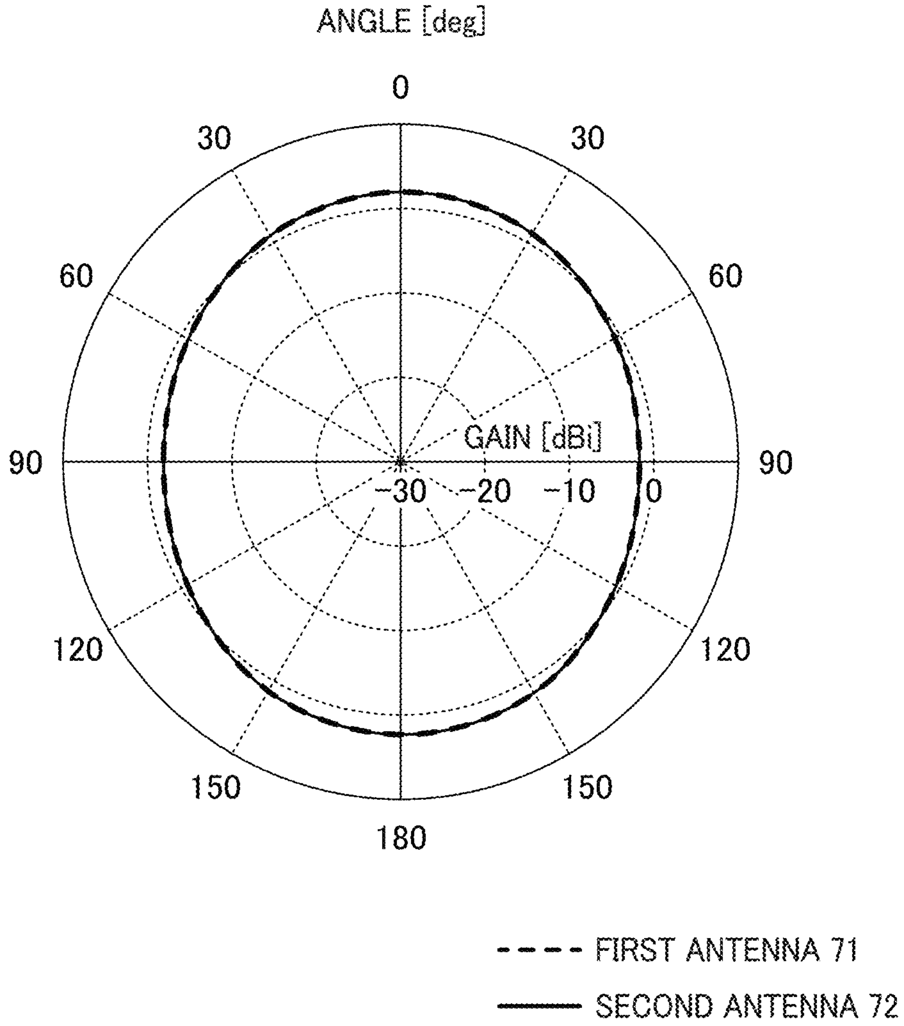
FIG. 9B is a diagram illustrating radiation patterns of a first antenna 71 and a second antenna 72 in an XY plane.
Figure 10A:
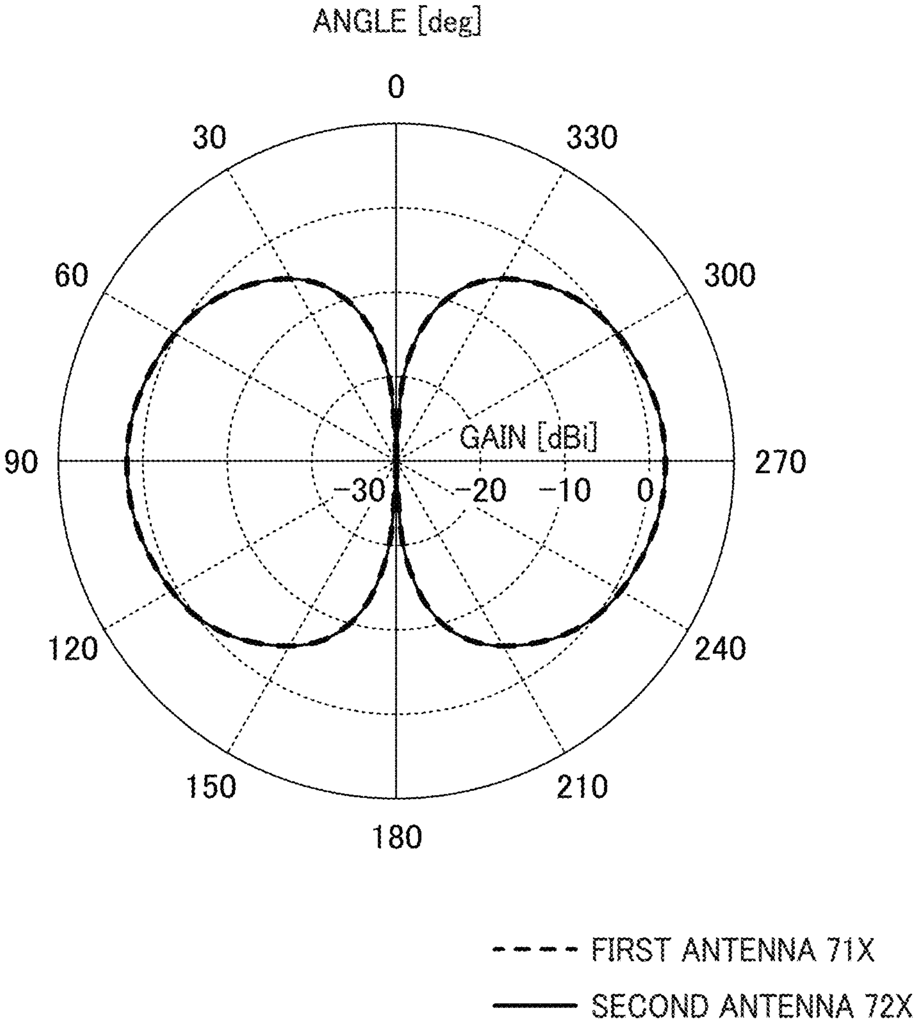
FIG. 10A is a diagram illustrating radiation patterns of a first antenna 71X and a second antenna 72X in a YZ plane.
Figure 10B:
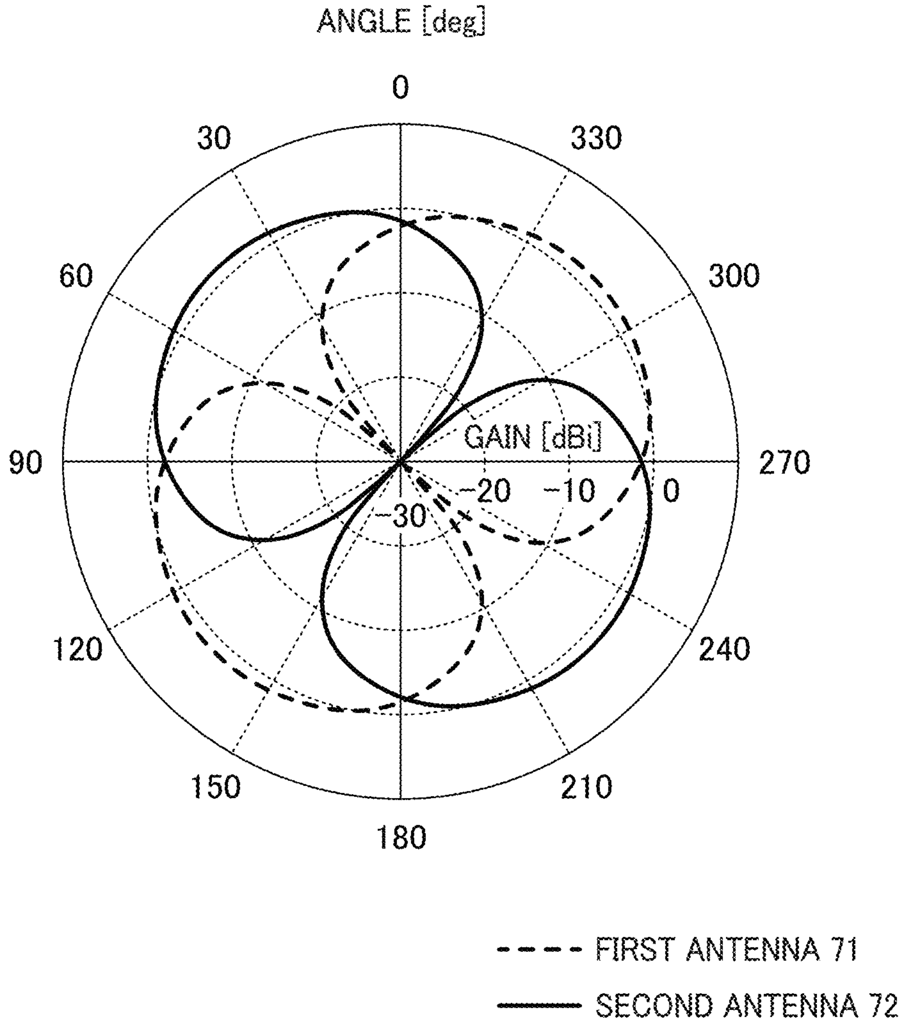
FIG. 10B is a diagram illustrating radiation patterns of a first antenna 71 and a second antenna 72 in a YZ plane.
Figure 11A:
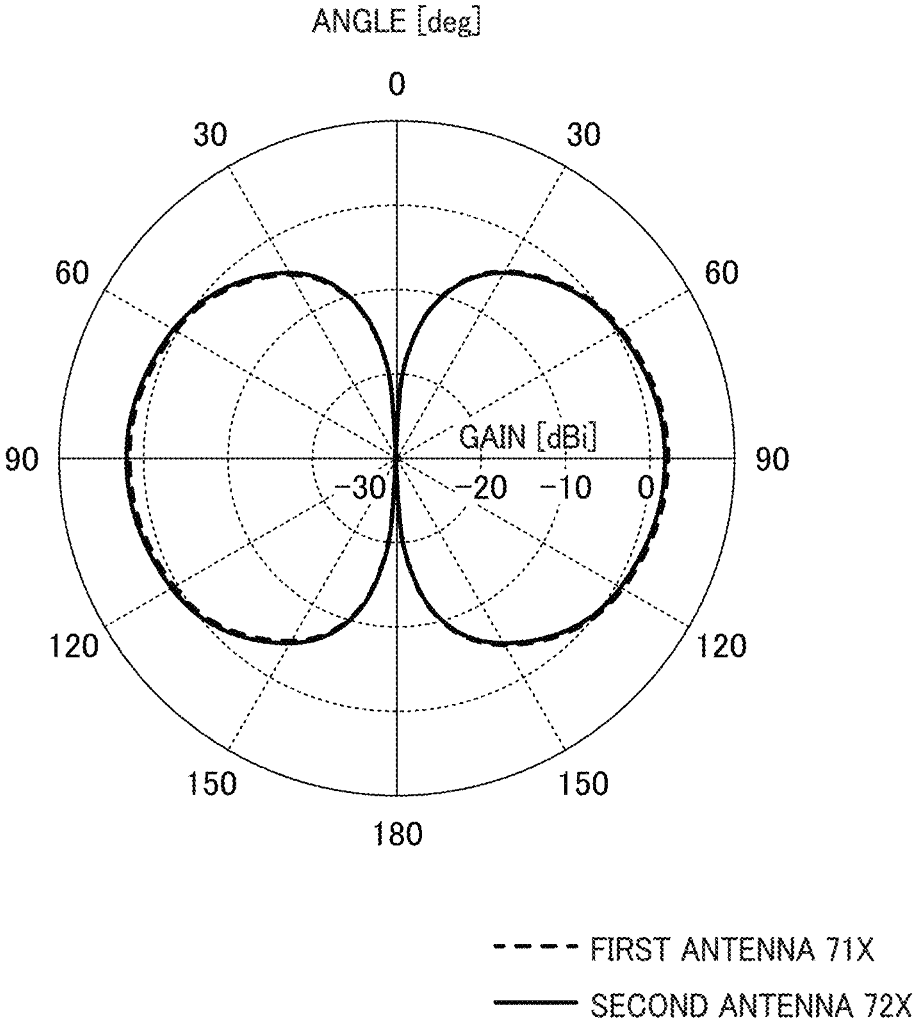
FIG. 11A is a diagram illustrating radiation patterns of a first antenna 71X and a second antenna 72X in a ZX plane.

FIG. 9A is a diagram illustrating radiation patterns of the first antenna 71X and the second antenna 72X in the XY plane, and FIG. 9B is a diagram illustrating radiation patterns of the first antenna 71 and the second antenna 72 in the XY plane. FIG. 10A is a diagram illustrating radiation patterns of the first antenna 71X and the second antenna 72X in the YZ plane, and FIG. 10B is a diagram illustrating radiation patterns of the first antenna 71 and the second antenna 72 in the YZ plane. FIG. 11A is a diagram illustrating radiation patterns of the first antenna 71X and the second antenna 72X in the ZX plane, and FIG. 11B is a diagram illustrating radiation patterns of the first antenna 71 and the second antenna 72 in the ZX plane.

As illustrated in FIG. 9A, in the XY plane, there is no angle, at which the gains of the first antenna 71X of Comparative Example and the second antenna 72X of Comparative Example outstandingly drop, being observed. However, as illustrated in FIG. 10A and FIG. 11A, in the YZ plane and the ZX plane, the angles, at which the gains of both antennas of Comparative Example drop, coincide at around 0° and around 180°, for example.

Figure 11B:
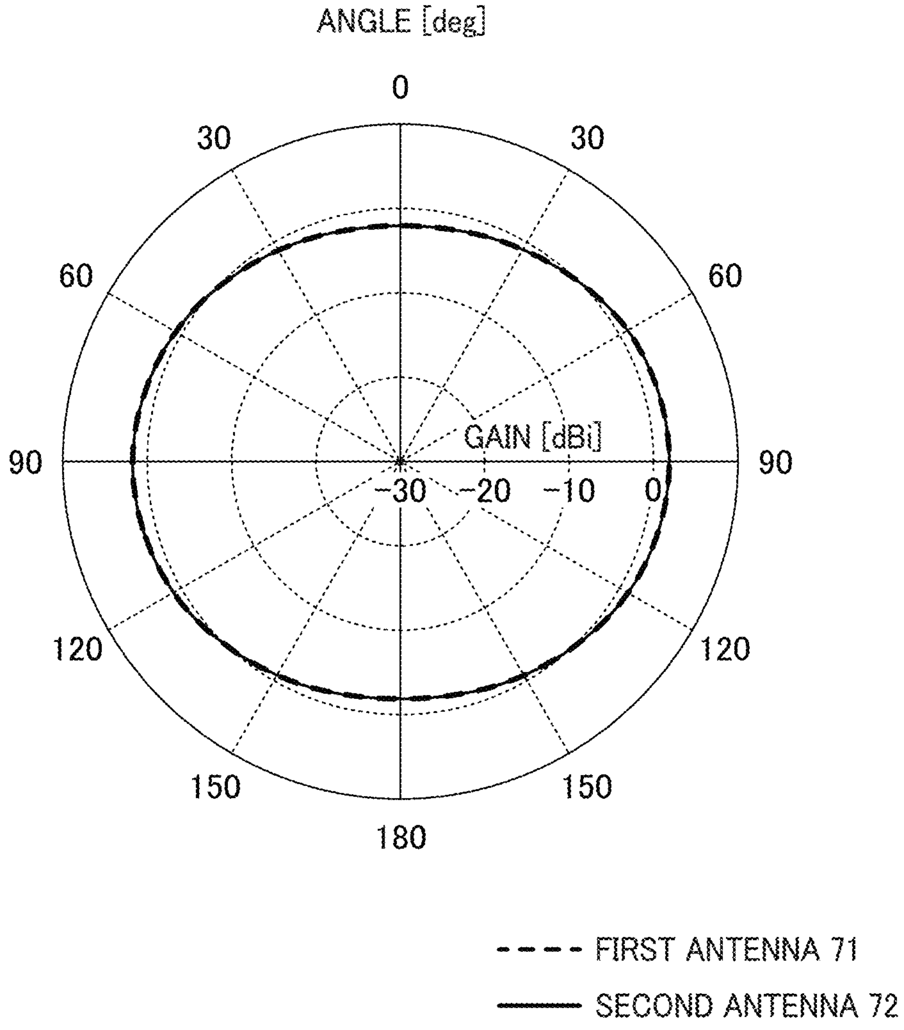
FIG. 11B is a diagram illustrating radiation patterns of a first antenna 71 and a second antenna 72 in a ZX plane.

Note that, as illustrated in FIG. 9B and FIG. 11B, in the XY plane and the ZX plane, there is no angle, at which the gains of the first antenna 71 of an embodiment of the present disclosure and the second antenna 72 of an embodiment of the present disclosure outstandingly drop, being observed, and as illustrated in FIG. 10B, in the ZX plane, the gains of both antennas of an embodiment of the present disclosure compensate for each other. As such, it can be seen that the antenna device 70 of an embodiment of the present disclosure achieves a non-directional radiation pattern, and improves the degree of freedom in installing the antenna device 70, as compared with the antenna device 70X of Comparative Example.

<<Configurations of Elements>>

Hereinafter, the configuration of each of the outer conductor-side element and the inner conductor-side element will be described with reference to the above-mentioned FIG. 1 to FIG. 4 again. Here, when a description common to the outer conductor-side element and the outer conductor-side element is given or when a description for one of the outer conductor-side element or the inner conductor-side element is given as a representative, these elements are sometimes referred to simply as "element". Accordingly, unless otherwise noted, the description on the configuration of the element is common to the outer conductor-side element and the inner conductor-side element.

As illustrated in FIG. 1 to FIG. 3, the element includes the coupling portion 52, a slit 60, and a rib 66.

The coupling portion 52 is a portion of the element at which the feeding line is coupled to the element. As illustrated in FIG. 4, the coupling portion 52 includes an outer conductor-side coupling portion 53 at which the outer conductor 56 of the first feeding line 36 is coupled to the first outer conductor-side element 31 and an inner conductor-side coupling portion 54 at which the core 57 of the first feeding line 36 is coupled to the first inner conductor-side element 32.

In an embodiment of the present disclosure, as illustrated in FIG. 4, the feeding portion (first feeding portion 37) is located at the center between the outer conductor-side coupling portion 53 and the inner conductor-side coupling portion 54. This causes the first feeding portion 37 to be located at the center of the line segment connecting the end portion of the first outer conductor-side element 31 on the side closest to the first inner conductor-side element 32 and the end portion of the first inner conductor-side element 32 on the side closest to the first outer conductor-side element 31, as mentioned above. Note that the term "center" is not limited to the exact center, but also encompasses a position displaced from the center by a predetermined distance.

Note that, as illustrated in FIG. 4, in the element, the separating portion 58 is formed. The separating portion 58 is a portion provided in part of the surroundings of the coupling portion 52 to separate the coupling portion 52 from a region other than the coupling portion 52. In an embodiment of the present disclosure, the separating portion 58 is formed by cutting out from (boring in) the element. This can improve workability when the feeding line is soldered to the coupling portion 52 since heat is less likely to be dissipated. Hence, the separating portion 58 may be formed such that a heat insulating material is inserted into a space formed by cutting out from the element. Note that the element does not have to have the separating portion 58 being formed therein.

The slit 60 is a cutout formed in the element in order to improve the frequency characteristics of the antenna. As illustrated in FIG. 3, the slit 60 includes an open end 61 on an outer edge of the element and has a closed end 62 inside the element. In addition, as illustrated in FIG. 3, assuming that an axis that is perpendicular to the axis A1 and passes through the first feeding portion 37 is an axis A3, the slit 60 includes a portion extending from the open end 61 toward the axis A3, a bent portion 63, and a portion extending toward the closed end 62 in a direction away from the first feeding portion 37. Then, as illustrated in FIG. 3, part of a path of the slit 60 from the open end 61 to the closed end 62 extends in at least a region of the element that is on the side opposite to the open end 61 relative to the axis A3. However, as described later, the shape of the slit 60 is not limited to that illustrated in FIG. 3. In addition, the element does not have to include the slit 60. Note that the details of the slit 60 will be described later.

In addition, in an embodiment of the present disclosure, as illustrated in FIG. 1 to FIG. 3, for example, the slit 60 is formed only in the inner conductor-side element (the first inner conductor-side element 32, the second inner conductor-side element 42). If the slit 60 were formed in the outer conductor-side element (the first outer conductor-side element 31, the second outer conductor-side element 41), there is a possibility that the feeding line (the first feeding line 36, the second feeding line 46) would interfere with the slit 60 and degrade the characteristics of the antenna. Accordingly, with the slit 60 being formed only in the inner conductor-side element, it is possible to suppress degradation of the characteristics of the antennas caused by the feeding line interfering with the slit 60. However, in the case where degradation of the characteristics of the antenna as mentioned above is acceptable, the slit 60 may be formed in the outer conductor-side element.

The rib 66 is a portion having a thickness larger than a portion other than the rib 66 in the element. The rib 66 is formed at the element in which the above-mentioned slit 60 is formed. Forming the rib 66 at the element can increase the strength of the element in which the slit 60 is formed. In an embodiment of the present disclosure, as illustrated in FIG. 3, the element includes two ribs 66, and the slit 60 is located between these two ribs 66 adjacent thereto. This can further increase the strength of the element. However, the shapes, the number, and the positions of arrangement of the ribs 66 are not limited to those illustrated in FIG. 3. For example, the ribs 66 may have a shape along the shape of the slit 60, a plurality of the ribs 66 may be disposed along the shape of the slit 60, or the rib 66 may be disposed only on the side on which the open end 61 is provided. In addition, the element does not include to have the rib 66.

<<Modifications of Coupling Portion 52 and Separating Portion 58>>

Hereinafter, modifications of the shapes of the coupling portion 52 and the separating portion 58 will be described. Note that although the inner conductor-side coupling portion 54 will be described below, similar modifications can be considered for the outer conductor-side coupling portion 53 as well.

Figure 12A:
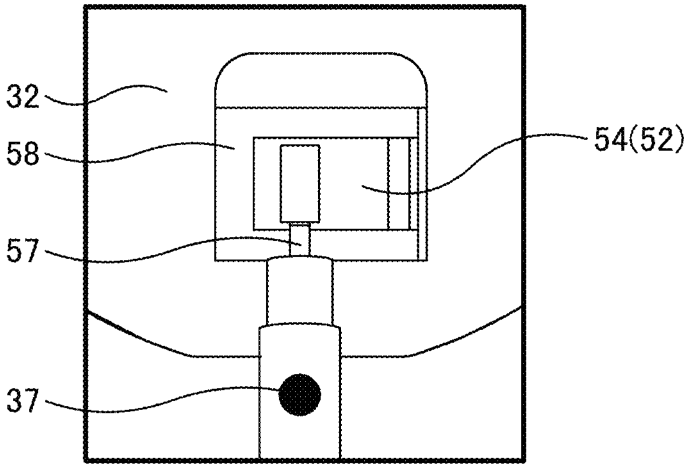
FIG. 12A is a diagram illustrating a first modification of an inner conductor-side coupling portion 54 and a separating portion 58 of a first antenna 30.
Figure 12B:
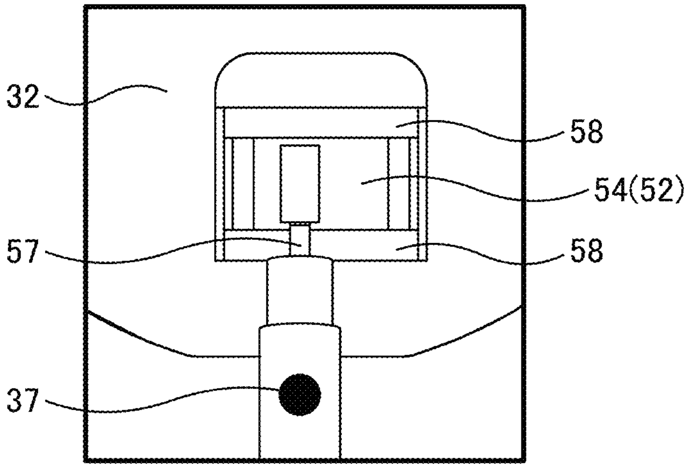
FIG. 12B is a diagram illustrating a second modification of an inner conductor-side coupling portion 54 and a separating portion 58 of a first antenna 30.
Figure 12C:
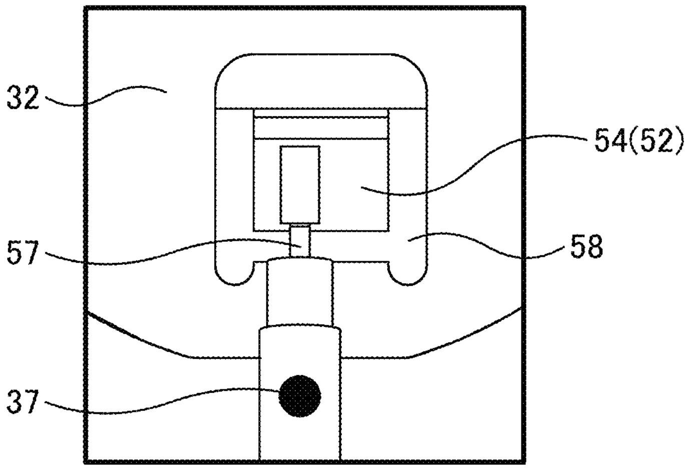
FIG. 12C is a diagram illustrating a third modification of an inner conductor-side coupling portion 54 and a separating portion 58 of a first antenna 30.

FIGS. 12A to 12C are diagrams illustrating modifications of the inner conductor-side coupling portion 54 and the separating portion 58 of the first antenna 30.

As illustrated in FIG. 4, in the periphery of the above-mentioned inner conductor-side coupling portion 54, a portion on the first feeding portion 37 side is coupled to the element, and a portion other than the portion coupled to the element is provided with the separating portion 58. However, the shapes of the inner conductor-side coupling portion 54 and the separating portion 58 are not limited to those illustrated in FIG. 4.

For example, as in the first modification illustrated in FIG. 12A, the inner conductor-side coupling portion 54 may be coupled to the element on only one of right or left side in the plan view (only on the right side in FIG. 12A). In addition, as in the second modification illustrated in FIG. 12B, the inner conductor-side coupling portion 54 may be coupled to the element on both right and left sides in the plan view. In addition, as in the third modification illustrated in FIG. 12C, the inner conductor-side coupling portion 54 may be coupled to the element, at a portion on the side opposite to the first feeding portion 37 in the periphery. That is, as illustrated in FIGS. 12A to 12C, the inner conductor-side coupling portion 54 only has to be coupled to the element in at least part of the outer periphery.

However, in the case illustrated in FIG. 12A, the inner conductor-side coupling portion 54 is coupled to the element only on the either right or left side, resulting in symmetry being broken, which may increase degradation of radio waves. In addition, in the case illustrated in FIG. 12C as well, the portion coupled to the element is away from the first feeding portion 37, which may increase degradation of radio waves. Accordingly, in the case where such degradation of radio waves is acceptable, the coupling portions 52 illustrated in FIG. 12A to FIG. 12C may be employed. However, it is preferable that the symmetry is maintained to reduce degradation of radio waves.

In the above-mentioned first modification to third modification, the inner conductor-side coupling portion 54 is coupled to the element in at least part of the outer periphery. However, the outer periphery of the inner conductor-side coupling portion 54 does not have to be coupled to the element. In other words, the separating portion 58 may surround the outer periphery of the inner conductor-side coupling portion 54. In this case, the inner conductor-side coupling portion 54 may be coupled to the element at a portion other than the outer periphery (for example, an inside of the inner conductor-side coupling portion 54).

<<Slit 60>>

Meanwhile, as mentioned above, the antenna device 10 of an embodiment of the present disclosure supports a wide frequency band such as 698 MHz to 5 GHz for 4G, 5G, and LTE. In an antenna device that supports such a wide band, the characteristics of a voltage standing wave ratio (VSWR) in the used frequency band needs to be a predetermined value or less (for example, a VSWR of 3.0 or less).

In addition, as mentioned above, the elements of the first antenna 30 and the second antenna 40 included in the antenna device 10 are formed as plate-shaped members to widen the area (width) of the elements. This makes it possible to achieve an antenna device that supports a wide band.

Moreover, the first antenna 30 has a curved contour protruding toward the first feeding portion 37 so as to reduce the area of the gap between the elements, and the second antenna 40 also has a curved contour (arc shape) protruding toward the second feeding portion 47 so as to reduce the area of the gap between the elements, as in the first antenna 30. This makes it possible to achieve an antenna device that can obtain a favorable band characteristics across a wide band.

However, in such an antenna device supporting a wide band, it may be difficult to improve the characteristics particularly in a low frequency band, only by widening the area (width) of each element and reducing the area of the gap between the elements. In view of this, the antenna device 10 of an embodiment of the present disclosure capable of improving the characteristics in a low frequency band by forming the slit 60 in part of the element of the antenna (the first inner conductor-side element 32 and the second inner conductor-side element 42 in an embodiment of the present disclosure). The following describes an improvement in characteristics of the antenna with this slit 60.

The effect of the slit 60 of an antenna 80A of an embodiment of the present disclosure will be examined below by using an antenna 80X of Reference Example.

Figure 13:
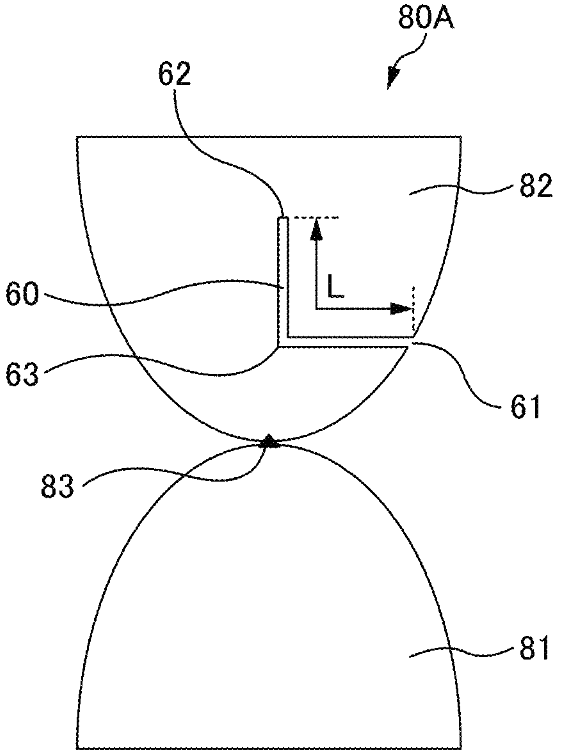
FIG. 13 is an explanatory diagram of an antenna 80A.
Figure 14:
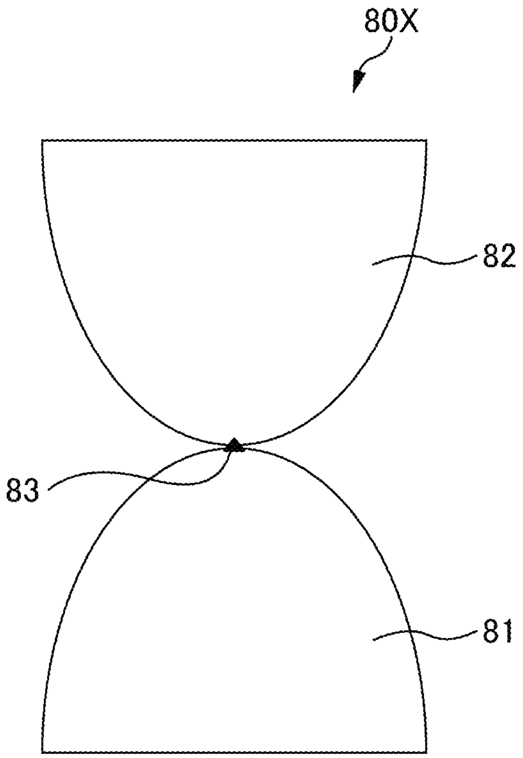
FIG. 14 is an explanatory diagram of an antenna 80X.

FIG. 13 is an explanatory diagram of the antenna 80A of an embodiment of the present disclosure. FIG. 14 is an explanatory diagram of the antenna 80X of Reference Example.

Here, the frequency characteristics of the antenna 80A of an embodiment of the present disclosure and the frequency characteristics of the antenna 80X of Reference Example will be examined by using models of bowtie antennas, similarly to the above-mentioned antenna device 70. The antenna 80A of an embodiment of the present disclosure includes the slit 60 in an inner conductor-side element 82. On the other hand, the antenna 80X of Reference Example does not have the slit 60 in an outer conductor-side element 81 or the inner conductor-side element 82. In FIG. 13 and FIG. 14, a reference numeral 83 denotes a feeding portion. Note that in the following examination, frequency characteristics in the case where the length L of the slit 60 is changed will also be examined. Here, the length L of the slit 60 is a distance along the slit 60, and is the length of the path of the slit 60 from the open end 61 to the closed end 62.

Figure 15:
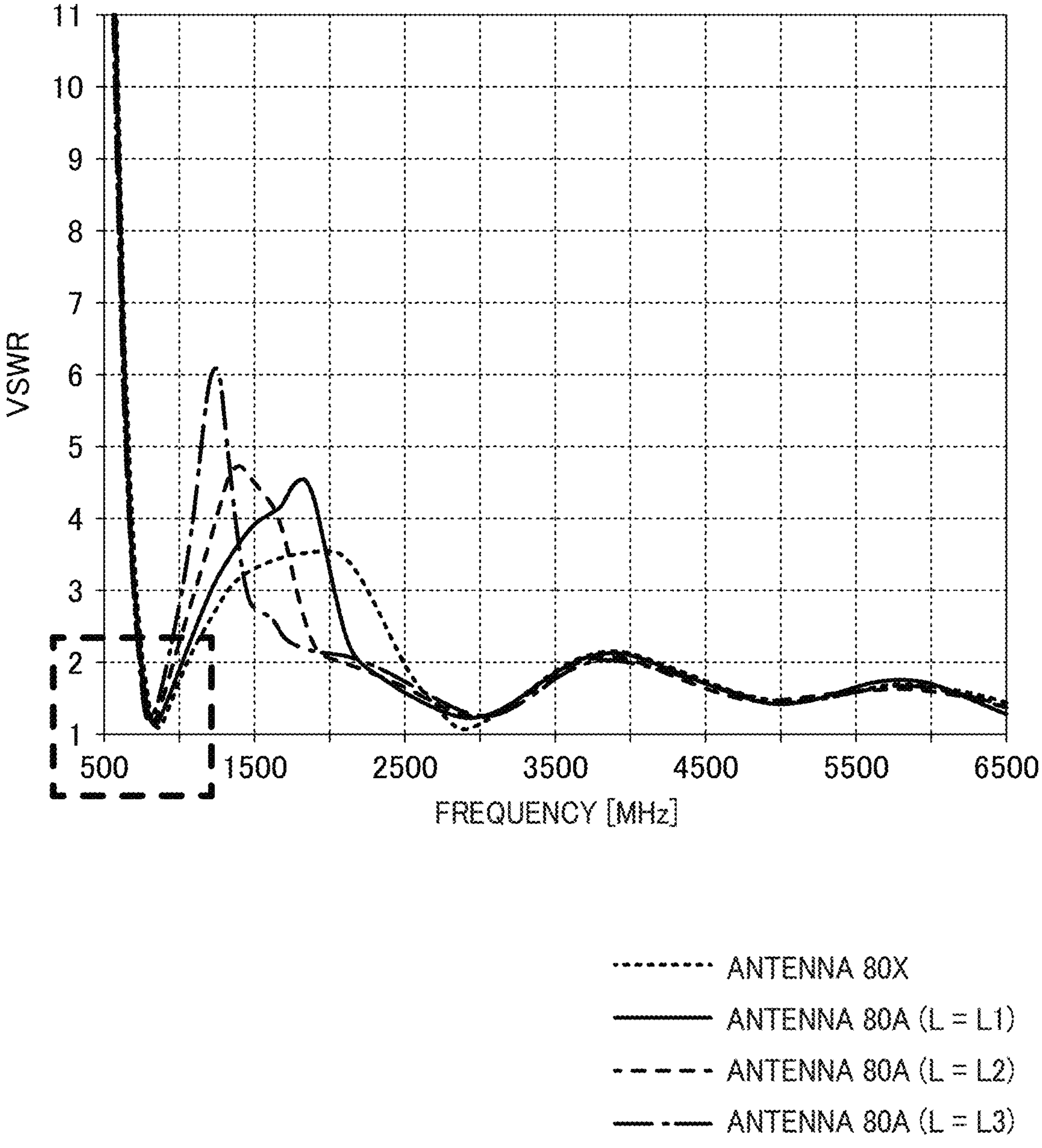
FIG. 15 is a graph illustrating an example of frequency characteristics of an antenna 80A and an antenna 80X.
Figure 16:
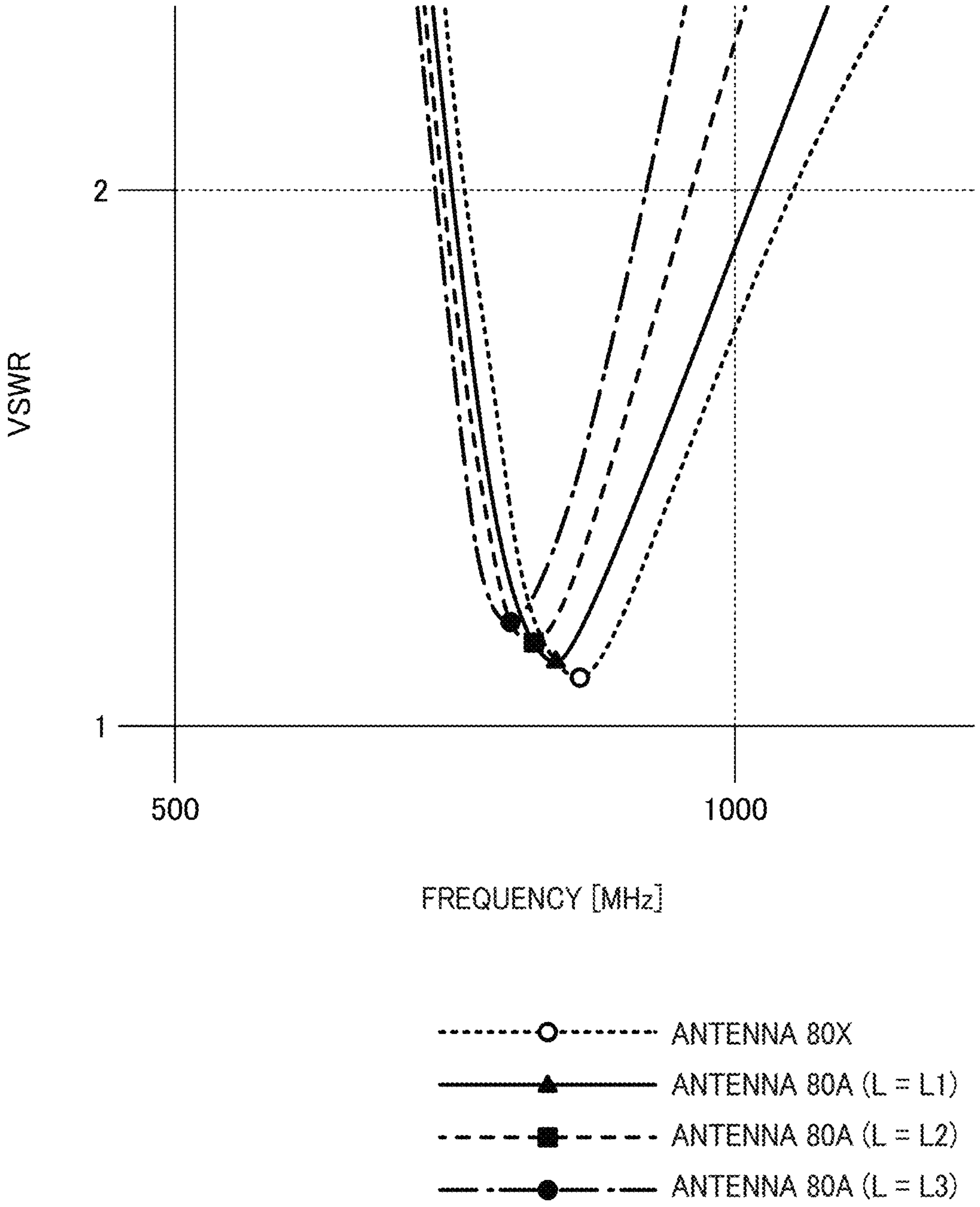
FIG. 16 is an enlarged view illustrating part of a low frequency band of a graph illustrating an example of frequency characteristics of an antenna 80A and an antenna 80X.

FIG. 15 is a graph illustrating an example of the frequency characteristics of the antenna 80A and the antenna 80X. FIG. 16 is an enlarged view illustrating part of a low frequency band of the graph illustrating the example of the frequency characteristics of the antenna 80A and the antenna 80X. In these figures, the horizontal axis represents the frequency and the vertical axis represents the voltage standing wave ratio (VSWR). In addition, in FIG. 15 and FIG. 16, a calculation result in the antenna 80X of Reference Example is given by a dotted line, and calculation results in the case where the length L of the slit 60 of the antenna 80A is changed to L1, L2, and L3 are given by a solid line, a dashed line, and a dashed-dotted line, respectively. Note that L1, L2, and L3 are in a relationship of L1<L2<L3. In addition, in FIG. 16, a white circle on the dotted line, a black triangle on the solid line, a black square on the dashed line, and a black circle on the dashed-dotted line indicate minimum values in the respective graphs, and in other words, indicate points at which the VSWR characteristics are favorable in the low frequency band illustrated in FIG. 16.

As illustrated in FIG. 15, when the calculation result in the antenna 80X of Reference Example and the calculations in the antenna 80A of an embodiment of the present disclosure are compared, it can be seen that the maximum value of each graph is shifted to the low band side in a range of 1000 MHz to 1500 MHZ, for example. Moreover, when the cases where the length L of the slit 60 in the antenna 80A of an embodiment of the present disclosure is changed to L1, L2, and L3 (L1<L2<L3) are compared, it can be seen that the maximum value of each graph is shifted to the low band side in the range of 1000 MHZ to 1500 MHz, for example.

Hence, it can be seen that causing an antenna to have the slit 60 has an effect to cancel a predetermined frequency band (for example, 1000 MHz to 1500 MHZ). In addition, it can be seen that increasing the length L of the slit 60 moves a frequency band to be canceled to the lower band side.

In addition, as illustrated in FIG. 16, when the calculation result in the antenna 80X of Reference Example and the calculations in the antenna 80A of an embodiment of the present disclosure are compared, it can be seen that the minimum value of each graph is shifted to the low band side. Moreover, when the cases where the length L of the slit 60 in the antenna 80A of an embodiment of the present disclosure is changed to L1, L2, and L3 (L1<L2<L3) are compared, it can be seen that the minimum value of each graph is shifted to the low band side.

Hence, causing an antenna to have the slit 60 can improve the VSWR characteristics particularly in a low frequency band. In addition, it can be seen that increasing the length L of the slit 60 moves a frequency band in which the VSWR characteristics can be improved to the low band side.

Next, the effect of the shape of the slit 60 will be examined by using the antenna 80A to an antenna 80C of an embodiment of the present disclosure.

Figure 17A:
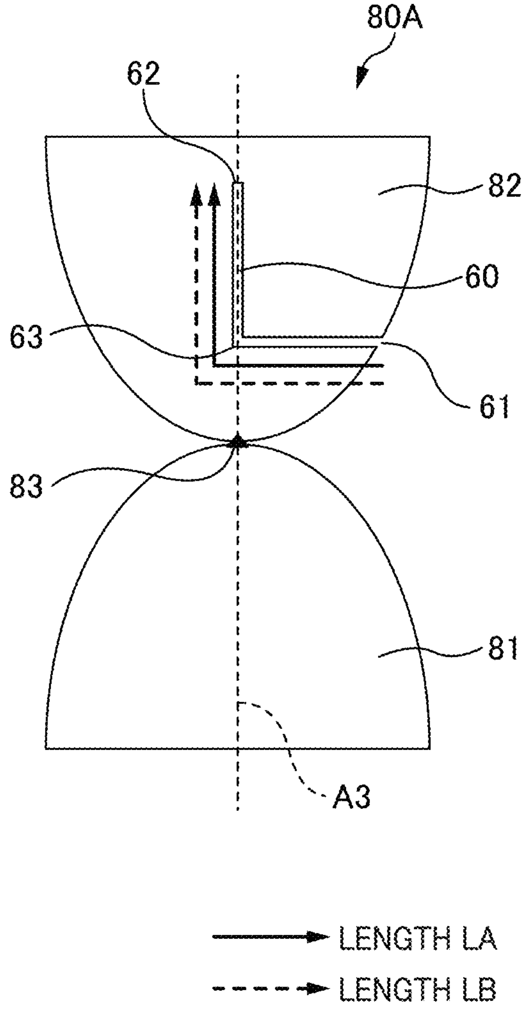
FIG. 17A is an explanatory diagram of an antenna 80A.
Figure 17B:
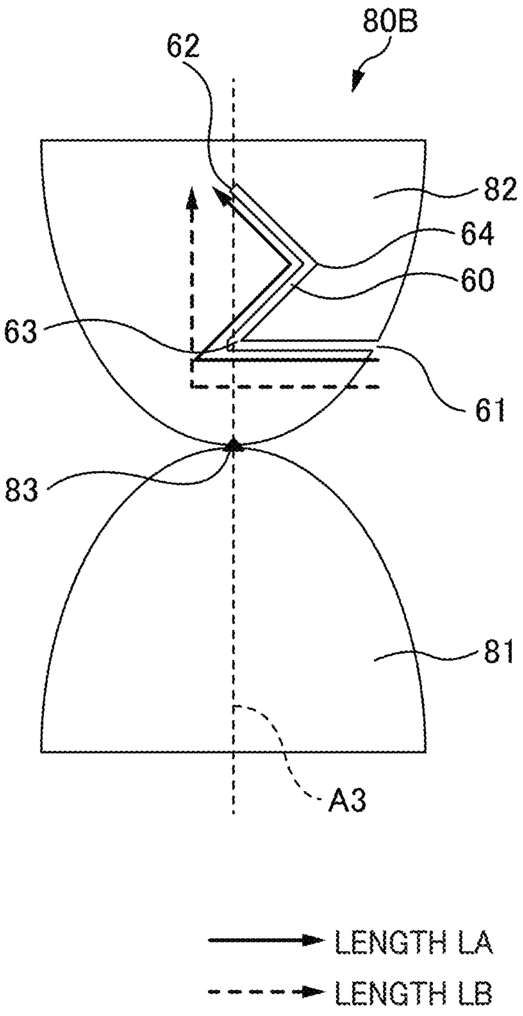
FIG. 17B is an explanatory diagram of an antenna 80B.

FIG. 17A is an explanatory diagram of the antenna 80A. FIG. 17B is an explanatory diagram of the antenna 80B. In addition, FIG. 17C is an explanatory diagram of the antenna 80C.

Here, as in the above-mentioned antenna 80A, the frequency characteristics of the antenna 80A to the antenna 80C each including the slit 60 will be examined by using models of a bowtie antenna. Each of the antenna 80A to the antenna 80C of an embodiment of the present disclosure includes the slit 60 in the inner conductor-side element 82. The slit 60 of the antenna 80A illustrated in FIG. 17A includes a portion extending inward from the open end 61, and a portion extending in the direction away from the feeding portion 83 through the bent part 63, as in the antenna 80A illustrated in FIG. 13. In addition, the slit 60 of the antenna 80B illustrated in FIG. 17B and the slit 60 of the antenna 80C illustrated in FIG. 17C each further include a bent part 64 unlike the antenna 80A. Moreover, when the slit 60 of the antenna 80B and the slit 60 of the antenna 80C are compared, the bent part 64 of the antenna 80B is located closer to the open end 61 of the slit 60 than the bent part 63, and the bent part 64 of the antenna 80C is located on the side opposite to the open end 61 of the slit 60 relative to the bent part 63.

Here, the lengths of the slits 60 of the antenna 80A to the antenna 80C will be examined, with two lengths LA and LB being defined. The length LA of the slits 60 illustrated in FIG. 17A to FIG. 17C is, as with the length L of the slit 60 of the FIG. 13, a distance along the slit 60, and is the length of the path of the slit 60 from the open end 61 to the closed end 62. In addition, the length LB of the slits 60 illustrated in FIG. 17A to FIG. 17C is obtained by adding a distance, along the slit 60, to the farthest point (the bent part 63 in the antenna 80A and the antenna 80B, and the bent part 64 in the antenna 80C) from the open end 61 and the shortest distance between the farthest point from the open end 61 and the closed end 62. Note that "the shortest distance between the farthest point from the open end 61 and the closed end 62" is a distance connecting the bent part 63 and the closed end 62 in the antenna 80A illustrated in FIG. 17A and the antenna 80B illustrated in FIG. 17B, and a distance connecting the bent part 64 and the closed end 62 in the antenna 80C illustrated in FIG. 17C.

Figure 17C:
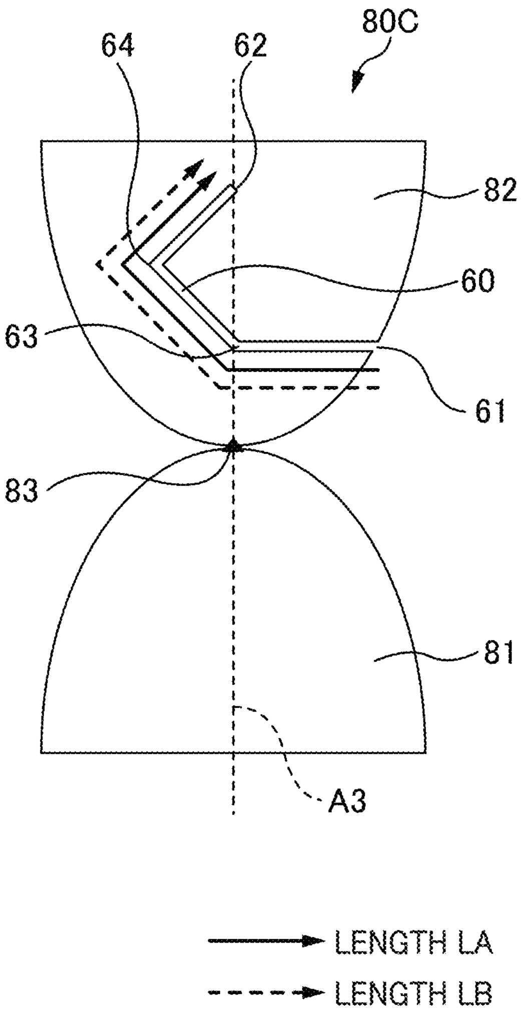
FIG. 17C is an explanatory diagram of an antenna 80C.

As illustrated in FIG. 17A to FIG. 17C, regarding the length LA, the slit 60 has a longer length LA in the antenna 80B and the antenna 80C than in the antenna 80A, and the slit 60 has the same length LA in the antenna 80B and the antenna 80C. In addition, as illustrated in FIG. 17A to FIG. 17C, regarding the length LB, the slit 60 has a longer length LB in the antenna 80C than in the antenna 80A and the antenna 80B, and the slit 60 has the same length LB in the antenna 80A and the antenna 80B.

Figure 18:
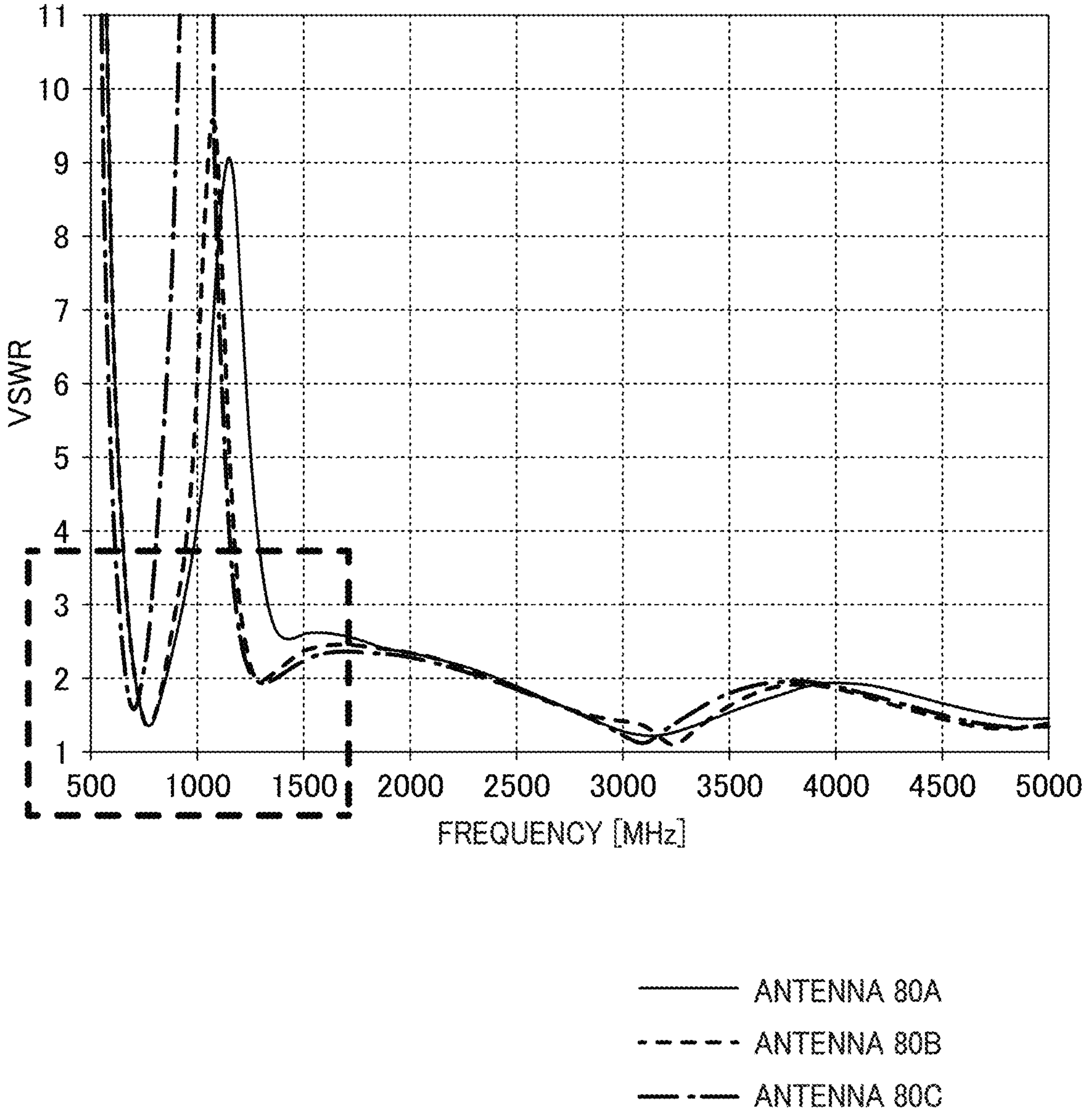
FIG. 18 is a graph illustrating an example of frequency characteristics of an antenna 80A to an antenna 80C.
Figure 19:
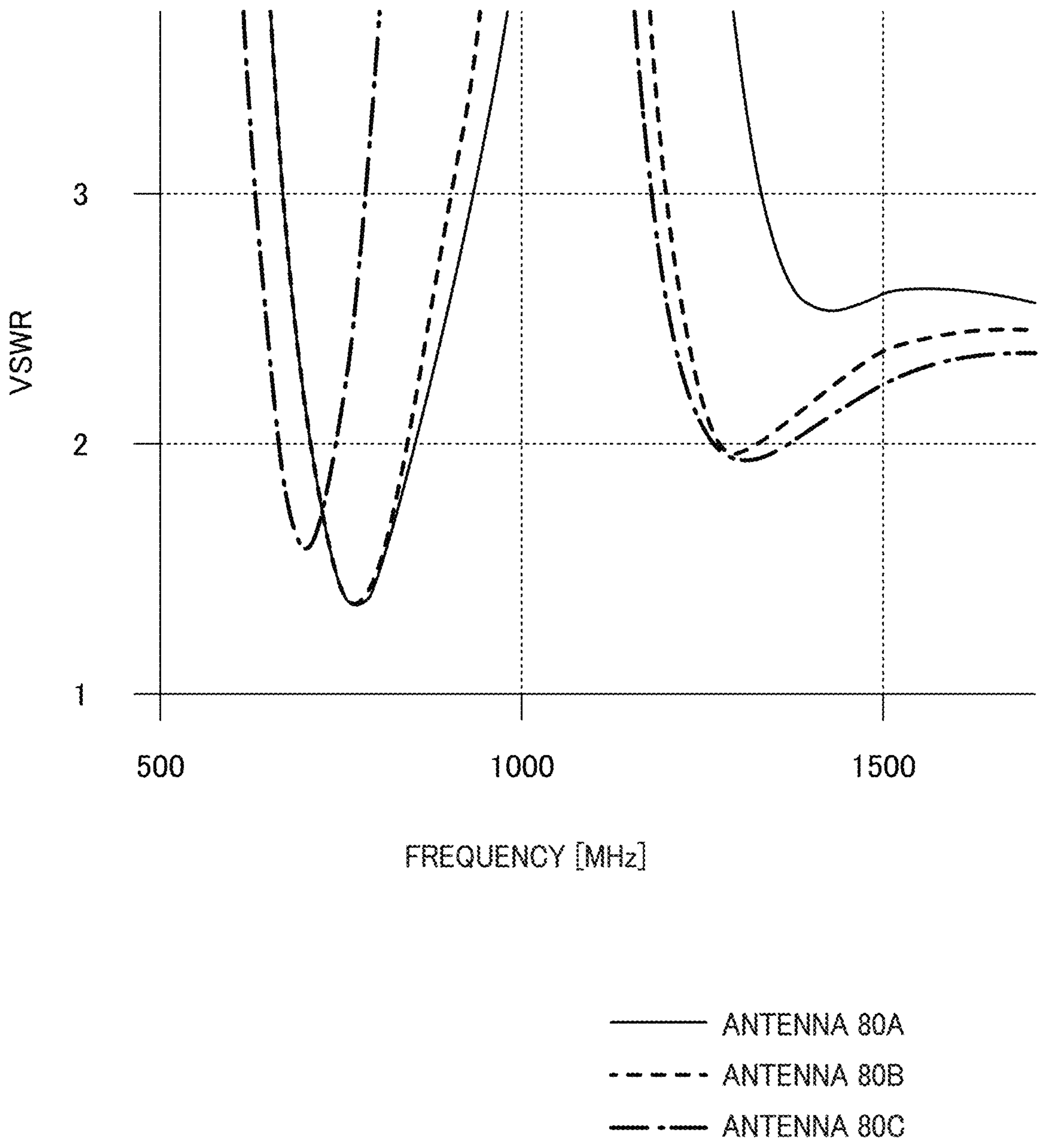
FIG. 19 is an enlarged view illustrating part of a low frequency band in a graph illustrating an example of frequency characteristics of an antenna 80A to an antenna 80C.

FIG. 18 is a graph illustrating an example of frequency characteristics of the antenna 80A to the antenna 80C. FIG. 19 is an enlarged view illustrating part of a low frequency band of the graph illustrating the example of the frequency characteristics of the antenna 80A to the antenna 80C. In these figures, the horizontal axis represents the frequency and the vertical axis represents the voltage standing wave ratio (VSWR). In addition, in FIG. 18 and FIG. 19, a calculation result in the antenna 80A is given by a solid line, a calculation result in the antenna 80B is given by a dashed line, and a calculation result in the antenna 80C is given by a dashed-dotted line.

As illustrated in FIG. 18 and FIG. 19, when the calculation result in the antenna 80A and the calculation results in the antenna 80B and the antenna 80C are compared in a range of 1000 MHz to 1500 MHz, for example, it can be seen that the longer the length LA is, the more the frequency band in which the VSWR characteristics are favorable is moved to the low band side. In addition, as illustrated in FIG. 18 and FIG. 19, in the range of 500 MHz to 1000 MHz, for example, when the calculation results in the antenna 80A and the antenna 80B and the calculation result in the antenna 80C are compared, it can be seen that the longer the length LB is, the more the frequency band in which the VSWR characteristics are favorable is moved to the low band side.

Next, the position of the open end 61 of the slit 60 will be examined by using an antenna 80D of an embodiment of the present disclosure.

Figure 20:
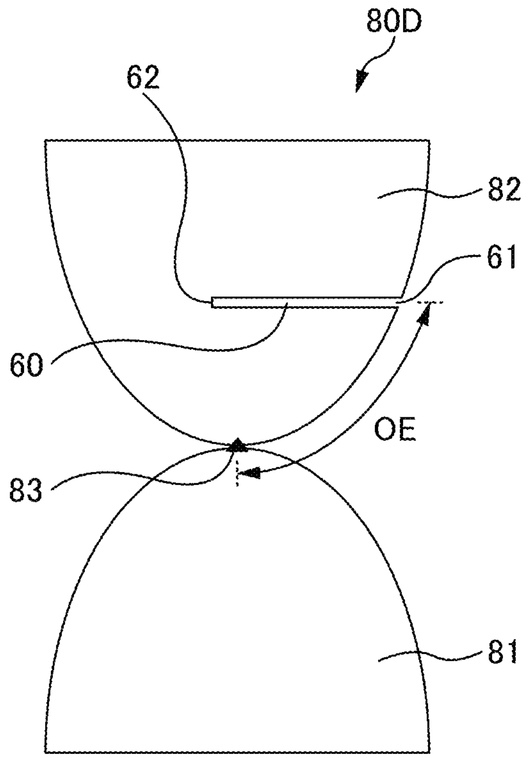
FIG. 20 is an explanatory diagram of an antenna 80D.

FIG. 20 is an explanatory diagram of the antenna 80D.

Here, the frequency characteristics of the antenna 80D having the slit 60 with the open end 61 located at a position different from the above will be examined by using models of bowtie antennas, as in the above-mentioned antenna 80A. Here, as illustrated in FIG. 20, a length OE represents a length of an outer edge of an element (here, the inner conductor-side element 82) from the feeding portion 83 to the open end 61. Then, in the following examination, the frequency characteristics in the case where the length OE is changed will be examined.

Figure 21:
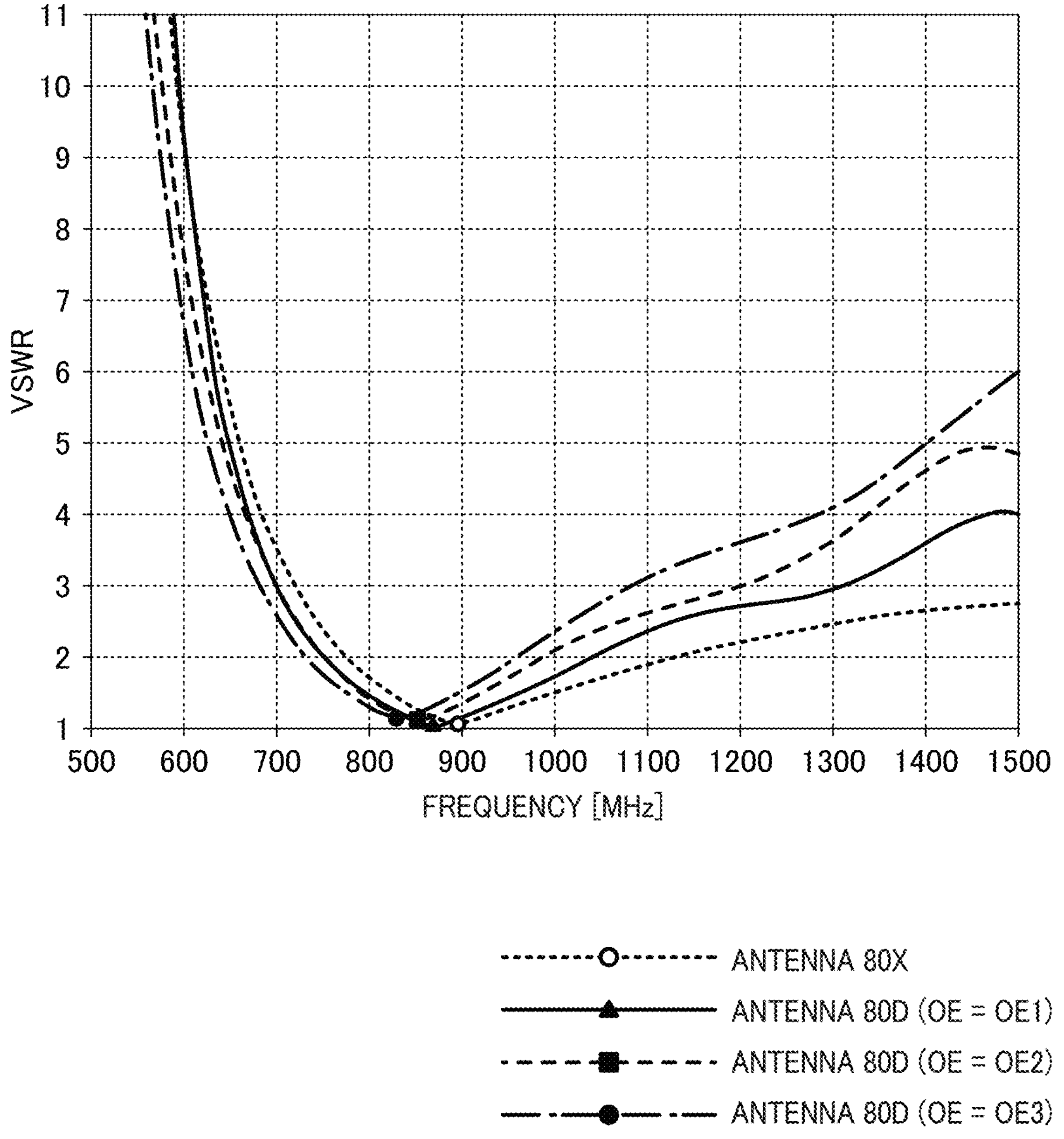
FIG. 21 is a graph illustrating an example of frequency characteristics of an antenna 80D and an antenna 80X.

FIG. 21 is a graph illustrating an example of the frequency characteristics of the antenna 80D and the antenna 80X. In these figures, the horizontal axis represents the frequency and the vertical axis represents the voltage standing wave ratio (VSWR). In addition, in FIG. 21, a calculation result in the antenna 80X (without the slit 60) of Reference Example is given by a dotted line and calculation results when the length OE of the antenna 80D is changed to OE1, OE2, and OE3 are given by a solid line, a dashed line, and a dashed-dotted line, respectively. Note that OE1, OE2, and OE3 are in a relationship of OE1>OE2>OE3. In addition, in FIG. 21, a white circle on the dotted line, a black triangle on the solid line, a black square on the dashed line, and a black circle on the dashed-dotted line indicate minimum values in the respective graphs, and in other words, indicate points at which the VSWR characteristics are favorable in the low frequency band illustrated in FIG. 21.

As illustrated in FIG. 21, when the antenna 80D of an embodiment of the present disclosure having the slit 60 and the antenna 80X of Reference Example without the slit 60 are compared, it can be seen that the minimum values of the graphs are shifted more to the low band side in the antenna 80D in all the cases of OE1, OE2, and OE3 than in the antenna 80X. In addition, when the cases where the length OE in the antenna 80D of an embodiment of the present disclosure is changed to OE1, OE2, and OE3 (OE1>OE2>OE3) are compared, it can be seen that the minimum value of the graph is shifted to the low band side.

Hence, it can be seen that a frequency band in which the VSWR characteristics can be improved is shifted to the low band side by setting the position of the open end 61 of the slit 60 closer to the feeding portion 83.

Next, the direction of the slit 60 will be examined by using the antenna 80A and an antenna 80E of an embodiment of the present disclosure.

Figure 22A:
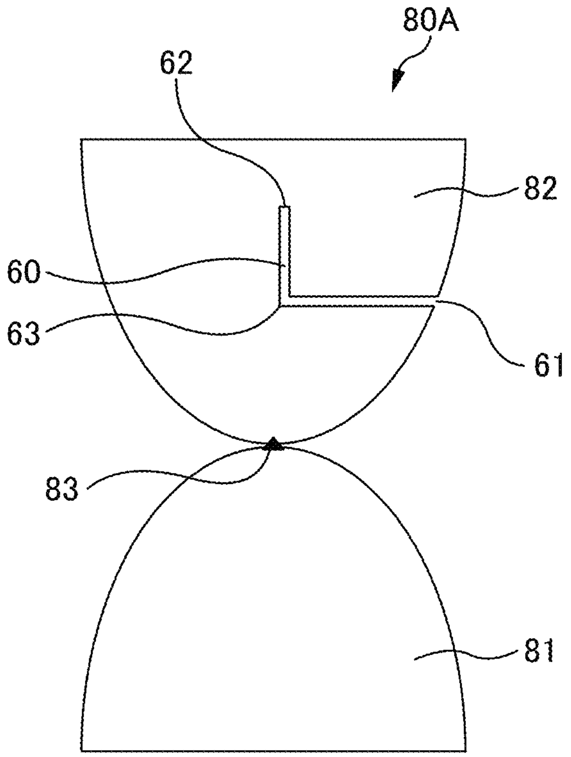
FIG. 22A is an explanatory diagram of an antenna 80A.
Figure 22B:
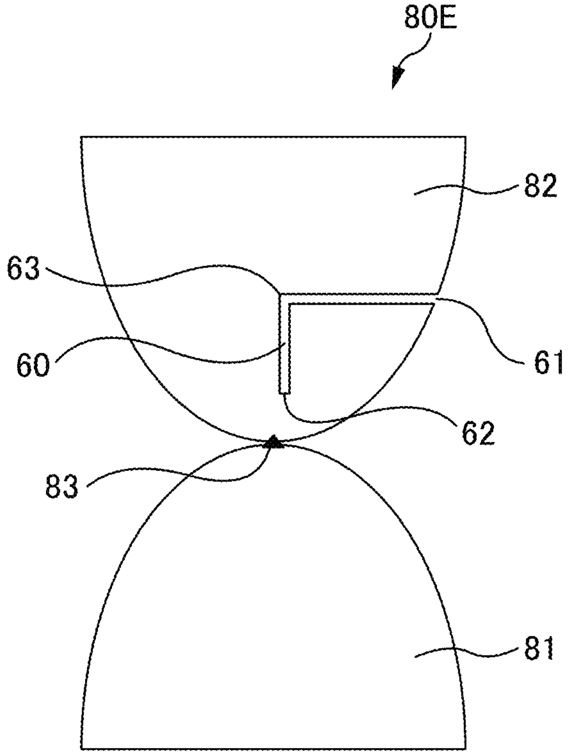
FIG. 22B is an explanatory diagram of an antenna 80E.

FIGS. 22A and 22B are explanatory diagrams of the antenna 80A and the antenna 80E, respectively.

Here, the frequency characteristics of the antenna 80A to the antenna 80C each including the slit 60 will be examined by using models of bowtie antennas. Each of the antenna 80A and the antenna 80E of an embodiment of the present disclosure includes the slit 60 in the inner conductor-side element 82, as in the above-mentioned antenna 80A. In the antenna 80A illustrated in FIG. 22A, the path of the slit 60 from the bent part 63 to the closed end 62 includes a portion extending in a direction away from the feeding portion 83 as in the antenna 80A illustrated in FIG. 13. On the other hand, in the antenna 80E illustrated in FIG. 22B, the path of the slit 60 from the bent part 63 to the closed end 62 includes a portion extending in a direction approaching the feeding portion 83. Note that, in the antenna 80A and the antenna 80E, the slit 60 has the same path length, and also has the same length OE from the feeding portion 83 to the open end 61. That is, the antenna 80A and the antenna 80E are different in distance between the feeding portion 83 and the closed end 62, and the distance between the feeding portion 83 and the closed end 62 in the antenna 80A is larger than the distance between the feeding portion 83 and the closed end 62 in the antenna 80E.

Figure 23:
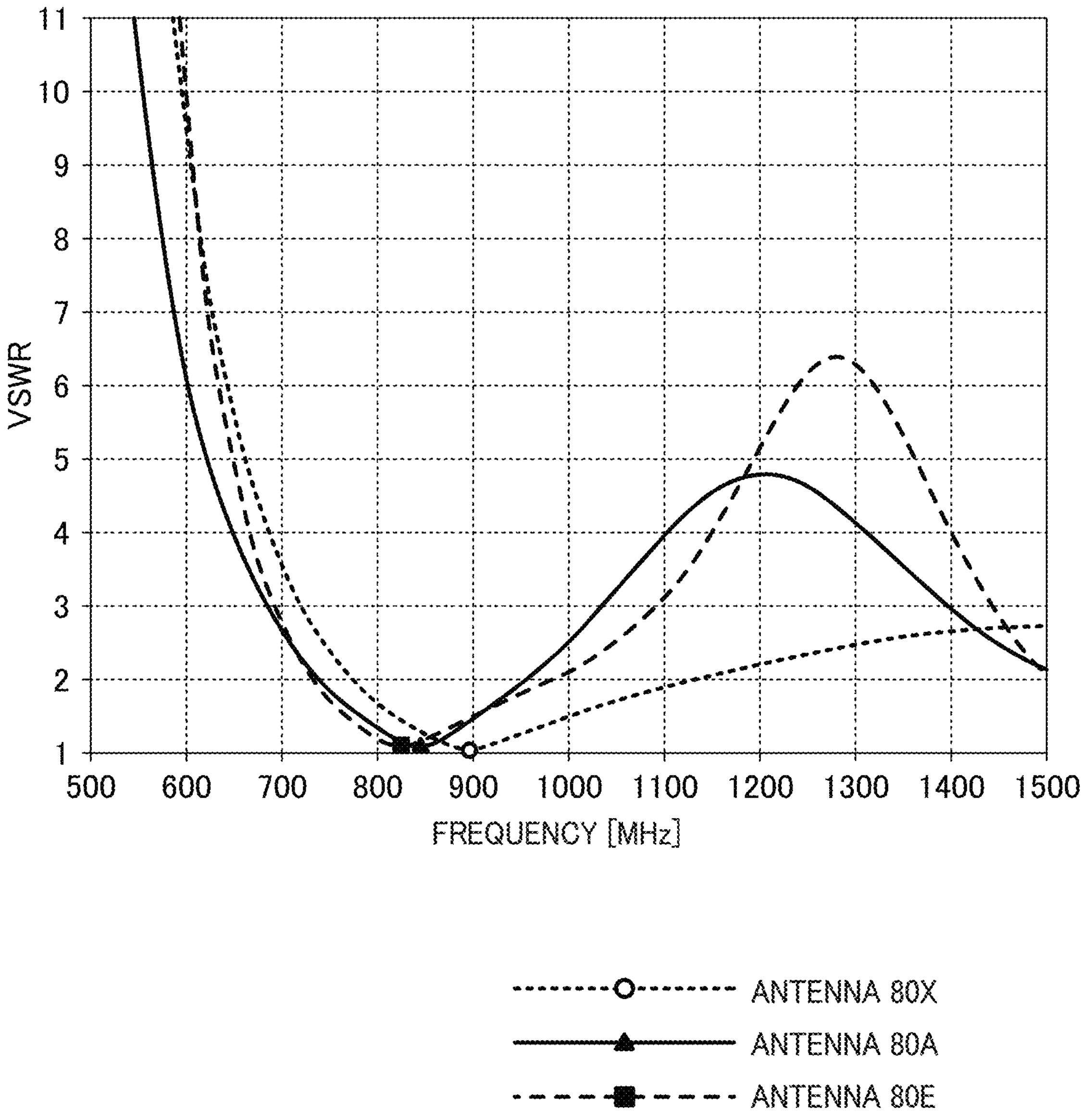
FIG. 23 is a graph illustrating an example of frequency characteristics of an antenna 80A and an antenna 80E.

FIG. 23 is a graph illustrating an example of frequency characteristics of the antenna 80A and the antenna 80E. In this figure, the horizontal axis represents the frequency and the vertical axis represents the voltage standing wave ratio (VSWR). In addition, in FIG. 23, a calculation result in the antenna 80X (without the slit 60) of Reference Example is given by a dotted line, a calculation result in the antenna 80A is given by a solid line, and a calculation result in the antenna 80E is given by a dashed line. In addition, in FIG. 23, a white circle on the dotted line, a black triangle on the solid line, and a black square on the dashed line indicate minimum values in the respective graphs, and in other words, indicate points at which the VSWR characteristics are favorable in the low frequency band illustrated in FIG. 23.

As illustrated in FIG. 18 and FIG. 19, when the antenna 80A and the antenna 80E of embodiments of the present disclosure having the slit 60 and the antenna 80X of Reference Example without the slit 60 are compared, it can be seen that the minimum values of the graphs are shifted more to the low band side in both of the antenna 80A and the antenna 80E than in the antenna 80X. In addition, when the calculation result in the antenna 80A and the calculation result in the antenna 80E are compared, the antenna 80A has more favorable VSWR characteristics than those of the antenna 80E, particularly in the low frequency band (for example, 600 MHz to 700 MHZ).

Hence, in the antenna 80A, the path of the slit 60 to the closed end 62 includes a portion extending in a direction away from the feeding portion 83. That is, it can be seen that favorable VSWR characteristics can be achieved with an increase in the distance between the closed end 62 and the feeding portion 83.

<<Modifications of Slit 60>>

The above-mentioned slit 60 is formed only in the inner conductor-side element (the first inner conductor-side element 32, the second inner conductor-side element 42, or the inner conductor-side element 82). However, the position of the element having the slit 60 formed therein is not limited thereto.

Figure 24A:
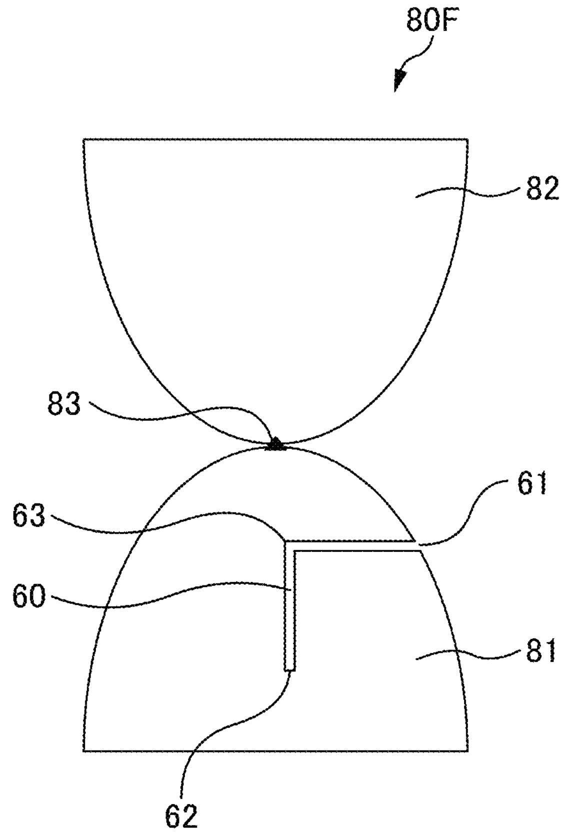
FIG. 24A is an explanatory diagram of an antenna 80F.
Figure 24B:
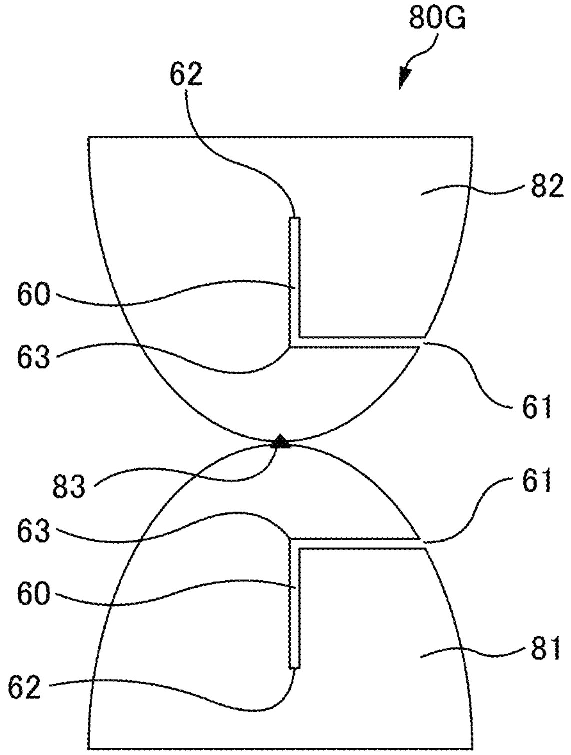
FIG. 24B is an explanatory diagram of an antenna 80G.

FIG. 24A is an explanatory diagram of an antenna 80F, and FIG. 24B is an explanatory diagram of an antenna 80G.

The antenna 80F illustrated in FIG. 24A includes the slit 60 formed only in the outer conductor-side element 81. In addition, the antenna 80G illustrated in FIG. 24B includes the slit 60 formed in the inner conductor-side element 82 and the slit 60 formed in the outer conductor-side element 81. Detailed results of examination are omitted, however, in the antenna 80F illustrated in FIG. 24A and the antenna 80G illustrated in FIG. 24B as well, it is possible to improve the frequency characteristics in the antennas, particularly in the low frequency band.

In addition, the above-mentioned slits 60 each include a portion linearly extending inward from the open end 61, and a portion linearly extending in the direction away from the feeding portion 83 through the bent part. However, the shapes of the slits 60 are not limited thereto.

Figure 25:
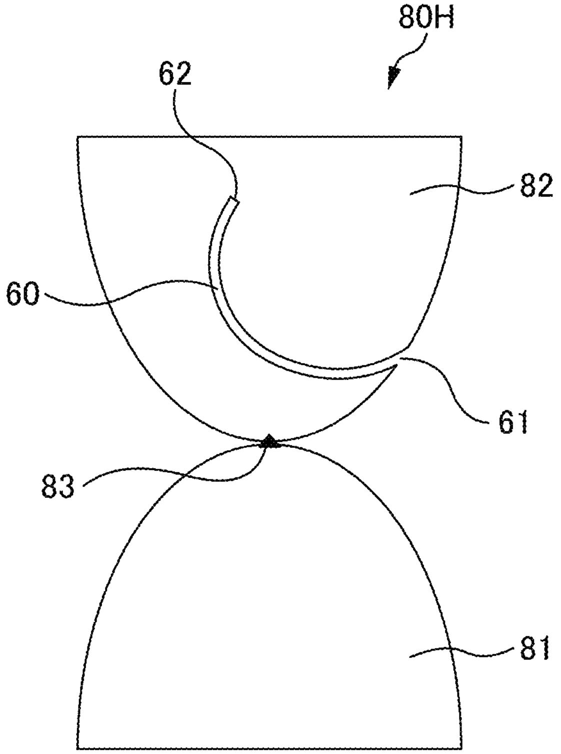
FIG. 25 is an explanatory diagram of an antenna 80H.

FIG. 25 is an explanatory diagram of an antenna 80H.

The antenna 80H illustrated in FIG. 25 includes the slit 60 extending in a curved shape that gently curves from the open end 61 to the closed end 62. Detailed results of examination are omitted, however, in the antenna 80H illustrated in FIG. 25 as well, it is possible to improve the frequency characteristics in the antenna, particularly in the low frequency band.

In addition, the above-mentioned slits 60 each include only one bent part. However, the shapes of the slits 60 are not limited thereto.

Figure 26A:
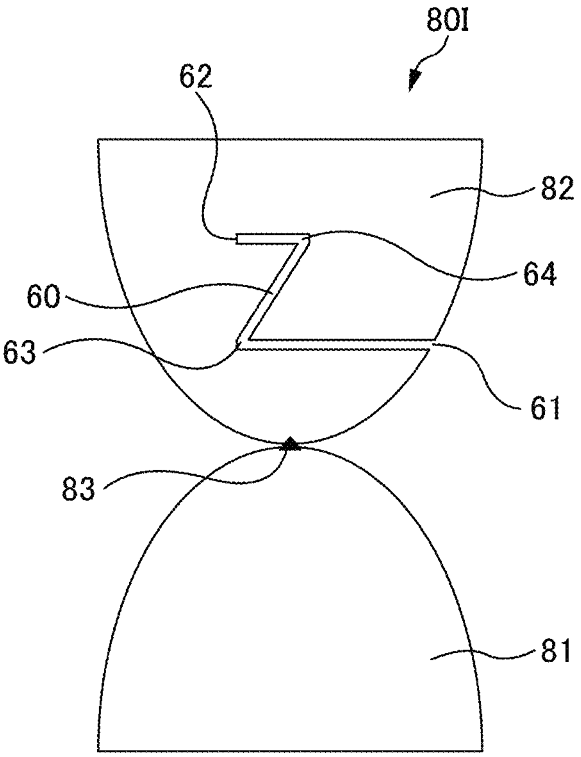
FIG. 26A is an explanatory diagram of an antenna 80I.
Figure 26B:
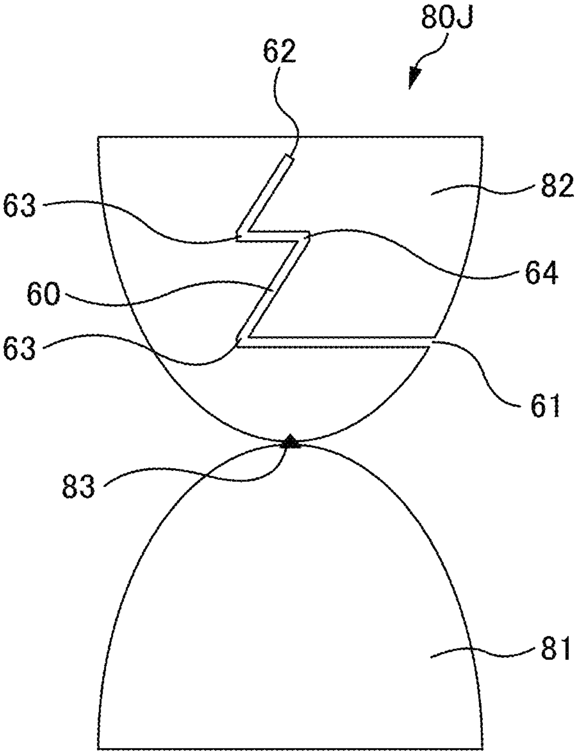
FIG. 26B is an explanatory diagram of an antenna 80J.

FIG. 26A is an explanatory diagram of an antenna 80I, and FIG. 26B is an explanatory diagram of an antenna 80J.

The antenna 80I illustrated in FIG. 26A includes the slit 60 in which two bent parts 63 and 64 are formed. In addition, the antenna 80J illustrated in FIG. 26B includes the slit 60 having three bent parts 63, 64, and 65 formed therein. Detailed results of examination are omitted, however, in the antenna 80I illustrated in FIG. 26A and the antenna 80J illustrated in FIG. 26B as well, it is possible to improve the frequency characteristics in the antennas, particularly in the low frequency band.

==Summary==

The antenna device 10 of an embodiment of the present disclosure has been described above. As illustrated in FIG. 1, FIG. 2, and FIG. 8B for example, the antenna device 10 of an embodiment of the present disclosure comprises: a first planar antenna (the first antenna 30, 71) for a linearly polarized wave, the first planar antenna including the first feeding portion 37; and a second planar antenna (the second antenna 40, 72) for a linearly polarized wave, the second planar antenna including the second feeding portion 47 that overlaps the first feeding portion 37 in a plan view when viewed in a direction (the X direction) perpendicular to a predetermined surface (the surface of the main body portion 50) of the first planar antenna (the first antenna 30, 71), wherein the linearly polarized wave of the first planar antenna and the linearly polarized wave of the second planar antenna intersect each other. The antenna device 10 of an embodiment of the present disclosure makes it possible to improve a degree of freedom in installing an antenna device 10 having a plurality of antennas (the first planar antenna and the second planar antenna).

In addition, as illustrated in FIG. 1 and FIG. 2 for example, in the antenna device 10 of an embodiment of the present disclosure, each of the first planar antenna (the first antenna 30) and the second planar antenna (the second antenna 40) includes an outer conductor-side element (the first outer conductor-side element 31 or the second outer conductor-side element 41) configured to be coupled with an outer conductor 56 of a feeding line (the first feeding line 36 or the second feeding line 46); and an inner conductor-side element (the first inner conductor-side element 32 or the second inner conductor-side element 42) configured to be coupled with the core 57 of the feeding line, the first feeding portion 37 is located between the first outer conductor-side element 31 and the first inner conductor-side element 32 of the first antenna 30, the second feeding portion 47 is located between the second outer conductor-side element 41 and the second inner conductor-side element 42 of the second antenna 40, an outer shape of the first outer conductor-side element 31 and an outer shape of the first inner conductor-side element 32 of the first antenna 30 are substantially symmetrical with each other with respect to the first axis (A1) passing through the first feeding portion 37, an outer shape of the second outer conductor-side element 41 and an outer shape of the second inner conductor-side element 42 of the second antenna 40 are substantially symmetrical with each other with respect to the second axis (A2) passing through the second feeding portion 47, and each of the outer conductor-side element and the inner conductor-side element has the coupling portion 52 configured to be coupled with the feeding line. This makes it possible to improve the isolation between the first planar antenna and the second planar antenna and thus achieve the antenna device 10 supporting a wide band.

In addition, as illustrated in FIG. 3, FIG. 13, FIG. 17A to FIG. 17C, FIG. 20, FIG. 22A and FIG. 22B, FIG. 24A and FIG. 24B, FIG. 25, and FIG. 26A and FIG. 26B for example, in the antenna device 10 of an embodiment of the present disclosure, at least one of the outer conductor-side element (the first outer conductor-side element 31, the second outer conductor-side element 41, or the outer conductor-side element 81) or the inner conductor-side element (the first inner conductor-side element 32, the second inner conductor-side element 42, or the inner conductor-side element 82) has the slit 60, and the slit 60 has the open end 61 at the outer edge of the element including the slit 60, and the closed end 62 inside the element. This makes it possible to improve frequency characteristics of the antennas included in the antenna device 10, particularly in a low frequency band.

In addition, as illustrated in FIG. 1, FIG. 2, and FIG. 3 for example, in the first planar antenna, the inner conductor-side coupling portion 54 of the coupling portion 52 is located between the slit 60 and the first feeding portion 37. This makes it possible to improve frequency characteristics of the antennas included in the antenna device 10, particularly in a low frequency band.

In addition, as illustrated in FIG. 17A to FIG. 17C for example, the antenna device 10 further comprises: the third axis (A3) substantially perpendicular to the first axis (A1), the third axis passing through the first feeding portion (the feeding portion 83) in the plan view of the first planar antenna (the antennas 80A to 80C), wherein at least part of a path of the slit 60 from the open end 61 to the closed end 62 extends in at least a region that is on the side opposite to the open end 61 relative to the third axis. This makes it possible to improve frequency characteristics of the antennas included in the antenna device 10, particularly in a low frequency band.

In addition, as illustrated in FIG. 13, FIG. 17A to FIG. 17C, FIG. 22, FIG. 24A and FIG. 24B, FIG. 25, and FIG. 26A, and FIG. 26B for example, the antenna device 10 further comprises: a third axis (A3) substantially perpendicular to the first axis (A1), the third axis passing through the first feeding portion (the feeding portion 83) in the plan view of the first planar antenna (the antennas 80A to 80C), wherein in the first planar antenna (the antennas 80A to 80C, and 80E to 80J), the slit 60 includes at least a portion extending from the open end 61 toward the third axis (A3), and a portion extending in a direction away from the first feeding portion (the feeding portion 83). This makes it possible to improve frequency characteristics of the antennas included in the antenna device 10, particularly in a low frequency band.

In addition, as illustrated in FIG. 1 to FIG. 3 for example, the element in which the slit 60 is formed has at least one rib 66, and the at least one rib 66 has a thickness larger than a thickness of a portion other than the at least one rib 66 in the element. This makes it possible to increase the strength of the element in which the slit 60 is formed.

In addition, as illustrated in FIG. 1 to FIG. 3 for example, the at least one rib 66 has two or more ribs 66, the element in which the slit 60 is formed includes the two or more ribs 66, and the slit 60 is located between two ribs 66 adjacent to each other of the two or more ribs 66. This makes it possible to increase the strength of the element in which the slit 60 is formed.

In addition, as illustrated in FIG. 1 to FIG. 3, FIG. 13, FIG. 17A to FIG. 17C, FIG. 20, FIG. 22A, FIG. 22B, FIG. 25, and FIG. 26A and FIG. 26B for example, the slit 60 is formed only in the inner conductor-side element (the first inner conductor-side element 32, the second inner conductor-side element 42, or the inner conductor-side element 82). This makes it possible to suppress the degradation of the characteristics of the antennas caused by the feeding line interfering with the slit 60.

In addition, as illustrated in FIG. 4 for example, the coupling portion 52 has: the outer conductor-side coupling portion 53 at which the feeding line (the first feeding line 36 or the second feeding line 46) is coupled to the outer conductor-side element (the first outer conductor-side element 31 or the second outer conductor-side element 41); and an inner conductor-side coupling portion 54 at which the feeding line is coupled to the inner conductor-side element (the first inner conductor-side element 32 or the second inner conductor-side element 42), the first feeding portion 37 is located at the center between the outer conductor-side coupling portion 53 and the inner conductor-side coupling portion 54 in the first planar antenna (the first antenna 30), and the second feeding portion 47 is located at the center between the outer conductor-side coupling portion 53 and the inner conductor-side coupling portion 54 in the second planar antenna (the second antenna 40). This makes it possible to improve frequency characteristics of the antennas included in the antenna device 10, particularly in a low frequency band.

In addition, as illustrated in FIG. 4 and FIG. 12A to FIG. 12C for example, in at least one of the outer conductor-side element or the inner conductor-side element, a separating portion 58 to separate the coupling portion 52 from a region other than the coupling portion 52 is formed in part of a periphery of the coupling portion 52. This makes it possible to suppress heat dissipation when the feeding line is soldered to the coupling portion 52, thereby being able to improve the workability.

In addition, as illustrated in FIG. 1, FIG. 2, and FIG. 8B for example, each of the outer conductor-side element (the first outer conductor-side element 31) and the inner conductor-side element (the first inner conductor-side element 32) in the first planar antenna (the first antenna 30, 71) has a curved outer edge convex toward the first feeding portion 37, and each of the outer conductor-side element (the second outer conductor-side element 41) and the inner conductor-side element (the second inner conductor-side element 42) in the second planar antenna (the second antenna 40, 72) has a curved outer edge convex toward the second feeding portion 47. This reduces the area of the gap between the outer conductor-side element and the inner conductor-side element and increases a capacitance therebetween, thereby being able to obtain favorable band characteristics across a wide band.

In the plan view, the second planar antenna is arranged at an angle larger than 0° and smaller than 180° relative to the first planar antenna about the first feeding portion 37 or the second feeding portion 47. This makes it possible to improve a degree of freedom in installing the antenna device 10 including a plurality of antennas (the first planar antenna and the second planar antenna).

Embodiment (s) of the present disclosure described above is/are simply to facilitate understanding of the present disclosure and is/are not in any way to be construed as limiting the present disclosure. The present disclosure may variously be changed or altered without departing from its essential features and encompass equivalents thereof.

REFERENCE SIGNS LIST

10, 70, 70X antenna device
30, 71, 71X first antenna
31 first outer conductor-side element
32 first inner conductor-side element
36 first feeding line
37 first feeding portion
40, 72, 72X second antenna
41 second outer conductor-side element
42 second inner conductor-side element
46 second feeding line
47 second feeding portion
50 main body portion
51 bent portion
52 coupling portion
53 outer conductor-side coupling portion
54 inner conductor-side coupling portion
56 outer conductor
57 core
58 separating portion
60 slit
61 open end
62 closed end
63, 64, 65 bent part
66 rib
67 housing portion
80A to 80J antenna
81 outer conductor-side element
82 inner conductor-side element
83 feeding portion

The invention claimed is:

1. An antenna device comprising:

a first planar antenna for a linearly polarized wave, the first planar antenna including a first feeding portion; and a second planar antenna for a linearly polarized wave, the second planar antenna including a second feeding portion that overlaps the first feeding portion in a plan view when viewed in a direction perpendicular to a predetermined surface of the first planar antenna, wherein at least one of the first planar antenna or the second planar antenna includes an outer conductor-side element configured to be coupled with an outer conductor of a feeding line, and an inner conductor-side element configured to be coupled with a core of the feeding line, the linearly polarized wave of the first planar antenna and the linearly polarized wave of the second planar antenna intersect each other, for each of the at least one of the first planar antenna or the second planar antenna that includes the outer conductor-side element and the inner conductor-side element, a respective one of the first feeding portion or the second feeding portion of that antenna is located between the outer conductor-side element and the inner conductor-side element of that antenna, an outer shape of the outer conductor-side element and an outer shape of the inner conductor-side element of the at least one of the first planar antenna or the second planar antenna are substantially symmetrical with each other, with respect to a first axis passing through the respective one of the first feeding portion or the second feeding portion, and each of the outer conductor-side element and the inner conductor-side element has a coupling portion configured to be coupled with the feeding line.

2. The antenna device according to claim 1, wherein each of the first planar antenna and the second planar antenna includes an outer conductor-side element configured to be coupled with the outer conductor of the feeding line, and an inner conductor-side element configured to be coupled with the core of the feeding line, the first feeding portion is located between the outer conductor-side element and the inner conductor-side element of the first planar antenna, the second feeding portion is located between the outer conductor-side element and the inner conductor-side element of the second planar antenna, an outer shape of the outer conductor-side element and an outer shape of the inner conductor-side element of the first planar antenna are substantially symmetrical with each other, with respect to the first axis passing through the first feeding portion, and an outer shape of the outer conductor-side element and an outer shape of the inner conductor-side element of the second planar antenna are substantially symmetrical with each other, with respect to a second axis passing through the second feeding portion.

3. The antenna device according to claim 2, wherein at least one of the outer conductor-side element or the inner conductor-side element has a slit, and the slit has an open end at an outer edge of the at least one of the outer conductor-side element or the inner conductor-side element including the slit, and a closed end inside the at least one of the outer conductor-side element or the inner conductor-side element.

4. The antenna device according to claim 3, wherein in the first planar antenna, the coupling portion of the at least one of the outer conductor-side element or the inner conductor-side element is located between the slit and the first feeding portion.

5. The antenna device according to claim 4, further comprising:

a third axis substantially perpendicular to the first axis, the third axis passing through the first feeding portion in the plan view of the first planar antenna, wherein at least part of a path of the slit from the open end to the closed end extends in at least a region that is on a side opposite to the open end relative to the third axis.

6. The antenna device according to claim 3, further comprising:

a third axis substantially perpendicular to the first axis, the third axis passing through the first feeding portion in the plan view of the first planar antenna, wherein in the first planar antenna, the slit includes at least a portion extending from the open end toward the third axis, and a portion extending in a direction away from the first feeding portion.

7. The antenna device according to claim 3, wherein the at least one of the outer conductor-side element or the inner conductor-side element in which the slit is formed has at least one rib, and the at least one rib has a thickness larger than a thickness of a portion other than the at least one rib in the element.

8. The antenna device according to claim 7, wherein the at least one rib includes two or more ribs, the at least one of the outer conductor-side element or the inner conductor-side element in which the slit is formed includes the two or more ribs, and the slit is located between two ribs adjacent to each other of the two or more ribs.

9. The antenna device according to claim 3, wherein the slit is formed only in the inner conductor-side element.

10. The antenna device according to claim 2, wherein in each of the first planar antenna and the second planar antenna the coupling portion of the outer conductor-side element is an outer conductor-side coupling portion at which the feeding line is coupled to the outer conductor-side element, and the coupling portion of the inner conductor-side element is an inner conductor-side coupling portion at which the feeding line is coupled to the inner conductor-side element, the first feeding portion is located at a center between the outer conductor-side coupling portion and the inner conductor-side coupling portion in the first planar antenna, and the second feeding portion is located at a center between the outer conductor-side coupling portion and the inner conductor-side coupling portion in the second planar antenna.

11. The antenna device according to claim 10, wherein in at least one of the outer conductor-side element or the inner conductor-side element, a separating portion to separate the at least one of the coupling portions from a region other than the coupling portion is formed in part of a periphery of the coupling portion.

12. The antenna device according to claim 2, wherein each of the outer conductor-side element and the inner conductor-side element in the first planar antenna has a curved outer edge convex toward the first feeding portion, and each of the outer conductor-side element and the inner conductor-side element in the second planar antenna has a curved outer edge convex toward the second feeding portion.

13. The antenna device according to claim 1, wherein in the plan view, the second planar antenna is arranged at an angle larger than 0° and smaller than 180° relative to the first planar antenna about the first feeding portion or the second feeding portion.

14. The antenna device according to claim 1, wherein at least one of the outer conductor-side element or the inner conductor-side element has a slit, and the slit has an open end at an outer edge of the at least one of the outer conductor-side element or the inner conductor-side element including the slit, and a closed end inside the at least one of the outer conductor-side element or the inner conductor-side element.

15. The antenna device according to claim 14, wherein in the first planar antenna, the coupling portion of the at least one of the outer conductor-side element or the inner conductor-side element is located between the slit and the first feeding portion.

* * * * *